(12) United States Patent
Maruyama et al.

(10) Patent No.: US 7,239,598 B2
(45) Date of Patent: Jul. 3, 2007

(54) OBJECTIVE LENS FOR OPTICAL PICK-UP

(75) Inventors: Koichi Maruyama, Tokyo (JP); Daisuke Koreeda, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 561 days.

(21) Appl. No.: 10/867,736

(22) Filed: Jun. 16, 2004

(65) Prior Publication Data

US 2005/0078593 A1 Apr. 14, 2005

(30) Foreign Application Priority Data

Jun. 17, 2003 (JP) .............................. 2003-171466

(51) Int. Cl.
*G11B 7/00* (2006.01)
(52) U.S. Cl. .............................. 369/112.23; 369/112.26
(58) Field of Classification Search ..................... None
See application file for complete search history.

(56) References Cited

U.S. PATENT DOCUMENTS

| | | |
|---|---|---|
| 6,118,594 A | 9/2000 | Maruyama |
| 6,449,095 B1 | 9/2002 | Ohtaki et al. |
| 6,587,272 B2 | 7/2003 | Nakai |
| 2001/0008513 A1 | 7/2001 | Arai et al. |

FOREIGN PATENT DOCUMENTS

| | | |
|---|---|---|
| JP | 2000-81566 | 3/2000 |
| JP | 2001-75118 | 3/2000 |
| JP | 2001-93179 | 4/2001 |
| JP | 2001-195769 | 7/2001 |

*Primary Examiner*—Paul W. Huber
(74) *Attorney, Agent, or Firm*—Greenblum & Bernstein, P.L.C.

(57) ABSTRACT

There is provided an objective lens for an optical pick-up which is used to record/reproduce data to/from at least three types of optical discs. Thicknesses t1, t2 and t3 of cover layers of first, second third optical discs are $t1 \cong 0.6$ mm, $t2 \cong 0.6$ mm, and $t3 \cong 1.2$ mm. Numerical apertures NA1, NA2 and NA3 for the first, second and third optical discs satisfy a relationship $NA1 \geq NA2 > NA3$. When the first optical disc is used, a substantially collimated light beam is incident on the objective lens. When the second or third optical disc is used, a diverging beam is incident on the objective lens. With regard to magnifications M1, M2 and M3 and focal lengths f1, f2 and f3 of the objective lens for the first, second and third optical discs, the following conditions (1), (2) and (3) are satisfied:

$$-0.02 < f1 \times M1 < 0.02 \quad (1)$$

$$-0.10 < f2 \times M2 < -0.04 \quad (2)$$

$$-0.29 < f3 \times M3 < -0.19. \quad (3)$$

17 Claims, 7 Drawing Sheets

OBJECTIVE LENS FOR OPTICAL PICK-UP

BACKGROUND OF THE INVENTION

The present invention relates to an objective lens for an optical pick-up used for an optical disc drive, which is capable of recording data to and/or reproducing data from a plurality of types of optical discs having different recording densities and having different thicknesses of cover layers.

There are various types of optical discs on which digital information is recorded at various densities, respectively. For example, a DVD (digital versatile disc) has a recording density higher that that of a CD (compact disc) or a CD-R (CD Recordable) and has a cover layer thinner than that of the CD or CD-R.

When the recording/reproducing for the DVD having a higher recording density is performed, a smaller beam spot diameter is required on the data recording layer of the DVD relative to a beam spot used for the CD having a lower recording density. For this reason, the optical pick-up is configured such that a NA (numerical aperture) is changed to a higher value to obtain a smaller beam spot diameter when the DVD is used and that the NA is changed to a lower value to obtain a larger beam spot diameter when the CD or CD-R is used.

The diameter of the beam spot decreases as a wavelength of the laser beam decreases. Therefore, in general, a laser beam having a wavelength of about 660 nm, which is lower than a wavelength of about 780 nm for the CD, is used for the DVD.

A condition of a spherical aberration in an optical system of the optical pick-up changes depending on a thickness of the cover layer of the optical disc being used. Therefore, it is required to correct the spherical aberration caused when the optical disc is changed to another one having different thickness of cover layer.

Japanese Patent Provisional Publication No. 2000-81566 discloses a CD/DVD compatible objective lens (i.e., an objective lens of an optical pick-up that can be used for both of the DVD and CD). The CD/DVD compatible objective lens has a diffracting structure on one of its lens surfaces. The diffracting structure has a plurality of concentric ring-shaped steps having a function of properly converging an incident beam on a data recording layer of an optical disc regardless of the thickness of the cover layer of the optical disc being used.

That is, the diffracting structure has wavelength dependence such that the spherical aberration changes when the wavelength of the incident beam changes. Consequently, the CD/DVD compatible objective lens is capable of supporting various types of optical discs having different thicknesses of the cover layers.

More specifically, the lens surface on which the diffracting structure is formed has an inner area which provides an NA required for the optical disc having relatively low recording density (e.g., CD), and an outer area which is situated outside the inner area and which provides an NA required for the optical disc having relatively high recording density (e.g., DVD).

The diffracting structure within the inner area has a function that the laser beam for the CD is properly converged on the data recording layer of the CD and that the laser beam for the DVD is properly converged on the data recording layer of the DVD. The diffracting structure within the outer area has a function that the laser beam for the CD does not contribute to the formation of the beam spot for the CD and the laser beam for the DVD is most properly converged on the data recording layer of the DVD.

With the above mentioned structure, with regard to the laser beam for CD, only the laser beam passed through the inner area is properly converged on the data recording layer of the CD, while the laser beam passed through the outer area diffuses on the data recording layer of the CD. Consequently, the beam spot having relatively large diameter is formed on the data recording layer of the CD.

With regard to the beam for DVD, both of the inner and outer areas converge the laser beam passing therethrough on the data recording layer of the DVD. Consequently, the beam spot having relatively small diameter is formed on the data recording layer of the DVD.

Recently, new technical standards concerning optical discs having further higher recording densities are proposed. One of such optical discs is an HD DVD (High Definition DVD) having a recording density higher than that of the DVD. The HD DVD has a thickness of the cover layer smaller than or equal to that of the DVD. For the HD DVD, the laser beam having a wavelength shorter than that of the DVD (a so-called blue laser) is required.

Against the background of the start of the practical use of the optical discs having further higher recording densities such as an HD DVD, the demand for optical disc devices which can provide compatibility among existing optical discs (e.g., CD and DVD) and the optical discs of the new technical standards (e.g., HD DVD) is increasing. To accomplish such an optical disc device, an objective lens that is capable of converging incident beam on the data recording layers of various types of optical discs including the CD, DVD and HD DVD is required.

However, the objective lens disclosed in the publication No. 2000-81566 is not configured to support the HD DVD. That is, when the blue laser beam is incident on the objective lens disclosed in the publication, aberrations including a spherical aberration are caused and therefore a beam spot suitable for the recordation and the reproduction of data of the HD DVD can not be formed.

Japanese Patent Provisional Publication No. 2001-93179 discloses an objective lens configured to support the DVD and the HD DVD. However, the objective lens disclosed in the publication No. 2001-93179 is not configured to support the CD.

Japanese Patent Provisional Publication No. 2001-195769 discloses an objective lens and an optical pick-up designed for recording data to and/or reproducing data from the CD, DVD and the new technical standard disc (i.e., HD DVD). The objective lens disclosed in the publication 2001-195769 has a diffracting structure which enables to record data to and/or reproduce data from the DVD when a collimated beam is incident on the objective lens. However, no explanation is made in this publication on what kind of diffracting structure is required to form a beam spot suitable for recording data to and/or reproducing data from each of the CD, DVD and HD DVD.

SUMMARY OF THE INVENTION

The present invention is advantageous in that it provides an objective lens of an optical pick-up which is capable of converging incident light beams on data recording layers of various types of optical discs, respectively. The various types of optical discs include existing optical discs (e.g., a DVD and CD) and an HD DVD.

According to an aspect of the invention, there is provided an objective lens for an optical pick-up which is used to record data to and/or to reproduce data from at least three types of optical discs by selectively using one of at least three light beams having different wavelengths, the at least three types of optical discs having at least two different thicknesses of cover layers. When a thickness of a first optical disc of the at least three types of optical discs to be used for recording data and/or reproducing data using a first light beam of the at least three light beams having a wavelength shortest of all the wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, t1 is substantially equal to 0.6 mm, t2 is substantially equal to 0.6 mm, and t3 is substantially equal to 1.2 mm.

Further, when a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, a relationship NA1≧NA2>NA3 is satisfied. When the first optical disc is used, a substantially collimated light beam of the first light beam is incident on the objective lens. When the second and third optical discs are used, diverging beams of the second and third light beams are incident on the objective lens, respectively.

Given that magnification and a focal length of the objective lens are respectively represented by M1 and f1 when the first optical disc is used, the magnification and the focal length of the objective lens are respectively represented by M2 and f2 when the second optical disc is used, and the magnification and the focal length of the objective lens are respectively represented by M3 and f3 when the third optical disc is used, following conditions (1), (2) and (3) are satisfied:

$$-0.02 < f1 \times M1 < 0.02 \tag{1}$$

$$-0.10 < f2 \times M2 < -0.04 \tag{2}$$

$$-0.29 < f3 \times M3 < -0.19 \tag{3}$$

According to another aspect of the invention, there is provided an optical pick-up used for recording data to and/or reproducing data from at least three types of optical discs having at least two different thicknesses of cover layers. The optical pick-up includes light sources capable of emitting at least three light beams having different wavelengths, one of the at least three light beams being selectively emitted when one of the at least three types of optical discs is used. The optical pick-up further includes an objective lens.

In this structure, when a thickness of a first optical disc of the at least three types of optical discs to be used for recording data and/or reproducing data using a first light beam of the at least three light beams having a wavelength shortest of all the wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, t1 is substantially equal to 0.6 mm, t2 is substantially equal to 0.6 mm, and t3 is substantially equal to 1.2 mm.

Further, when a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, a relationship NA1≧NA2>NA3 is satisfied. When the first optical disc is used, a substantially collimated light beam of the first light beam is incident on the objective lens. When the second and third optical discs are used, diverging beams of the second and third light beams are incident on the objective lens, respectively.

Given that magnification and a focal length of the objective lens are respectively represented by M1 and f1 when the first optical disc is used, the magnification and the focal length of the objective lens are respectively represented by M2 and f2 when the second optical disc is used, and the magnification and the focal length of the objective lens are respectively represented by M3 and f3 when the third optical disc is used, following conditions (1), (2) and (3) being satisfied:

$$-0.02 < f1 \times M1 < 0.02 \tag{1}$$

$$-0.10 < f2 \times M2 < -0.04 \tag{2}$$

$$-0.29 < f3 \times M3 < -0.19 \tag{3}$$

In the above mentioned two aspect of the invention, a spherical aberration, caused by a change of a refractive index due to differences among wavelengths of the light beams and by differences of thicknesses of cover layers among the optical discs, is corrected by adjusting magnification of the objective lens for each of the light beams. That is, the collimated beam of the first light beam is incident on the objective lens when the first optical disc is used, and diverging beams of the second and third light beams are incident on the objective lens, respectively, when the second and third optical discs are used. With this configuration, a beam spot suitable for recording data to and/or reproducing data from each of the first, second and third optical discs is formed on the data recording layer of the corresponding optical disc.

When a finite optical system is used in the optical pick-up, an aberration condition may be deteriorated due to an occurrence of a coma of an off-axis ray by a tracking operation. In addition, a tolerance to the aberration condition becomes lower as the required numerical aperture increases.

For this reason, the objective lens according to the above mentioned two aspects of the invention is used in a situation where the substantially collimated light beam is incident on the objective lens when the first optical disc is used, and the diverging beam is incident on the objective lens when the second or third optical disc is used. With this structure, even if the objective lens is shifted from an optical axis thereof by the tracking operation, the amount of the coma and astigmatism caused when the first optical disc is used is lowered to a negligible level.

Even though the substantially collimated light beam incident on the objective lens changes to a diverging beam or a converging beam if an oscillation wavelength of the light source changes due to temperature variations, the amount of the aberrations caused by the tracking operation is reduced since the condition (1) is satisfied.

Also, the objective lens is configured to satisfies the conditions (2) and (3). If f2×M2 gets larger than the upper limit of the condition (2) or if f3×M3 gets larger than the upper limit of the condition (3), an overcorrected spherical aberration remains. If f2×M2 gets lower than the lower limit of the condition (2) or if f3×M3 gets lower than the lower limit of the condition (3), an undercorrected spherical aberration is caused.

According to the above mentioned configuration of the two aspect of the invention, the spherical aberration is sufficiently corrected for each of the existing optical discs (optical discs D2 and D3) as well as the new technical standard optical disc (optical disc D1). Therefore, a suitable beam spot is formed on the data recording layer of each of the existing optical discs (optical discs D2 and D3) and the new technical standard optical disc (optical disc D1).

Optionally, at least one of lens surfaces of the objective lens may include a first region on which one of the first, second and third light beams corresponding to a numerical aperture required to record data to and/or to reproduce data from the third optical disc is incident, and a second region located outside the first region. The first region has a diffracting structure having a function of converging the first, second and third light beams on data recording layers of the first, second and third optical discs, respectively.

Further, the second region has a diffracting structure having a function of converging the first and second light beams on the data recording layers of the first and second optical discs, respectively, and having a function of not contributing to converging the third light beam. The diffracting structure within the second region is configured such that a diffraction order at which diffraction efficiency is maximized for the first light beam is a third order and that a diffraction order at which diffraction efficiency is maximized for the second light beam is a second order.

With this configuration, the first, second and third light beams passed through the first region are suitably converged on the data recording layers of the first, second and the third optical discs, respectively. Further, the first and second light beams passed through the second region are suitably converged on the data recording layers of the first and second optical discs, respectively. The third light beam passed through the second region is diffused. Further, deterioration of a wavefront aberration caused when the oscillation wavelength of the light source changes due to temperature variations can be suppressed.

Optionally, at least one of lens surfaces of the objective lens may include a first region on which one of the first, second and third light beams corresponding to a numerical aperture required to record data to and/or to reproduce data from the third optical disc is incident, and a second region located outside the first region. The second region has a diffracting structure having a function of converging the first and second light beams on data recording layers of the first and second optical discs, respectively, and having a function of not contributing to converging the third light beam.

Further, the diffracting structure within the second region is configured such that, at each step between adjacent refractive surfaces portions, an additional optical path length for the first laser beam added in an outer refractive surface portion with respect to an inner refractive surface portion is substantially equal to $3\lambda_1$ or $-3\lambda_1$, where $\lambda_1$ represents a wavelength of the first laser beam.

With this configuration, the second region can function as a filter configured such that the diffraction efficiency for the first and second light beams passed through the second region is hardly reduced, and the third light beam passed through the second region is not converged.

Optionally, at least one of lens surfaces of the objective lens may include a first region on which one of the first, second and third light beams corresponding to a numerical aperture required to record data to and/or to reproduce data from the third optical disc is incident, and a second region located outside the first region. The second region has a diffracting structure having a function of converging the first and second light beams on data recording layers of the first and second optical discs, respectively, and having a function of not contributing to converging the third light beam.

Further, the diffracting structure within the second region is configured such that, at each step between adjacent refractive surfaces portions, an additional optical path length for the first laser beam added in an outer refractive surface portion with respect to an inner refractive surface portion is substantially equal to $5\lambda_1$ or $-5\lambda 1$, where $\lambda_1$ represents a wavelength of the first laser beam.

With this configuration, the second region can function as a filter configured such that the diffraction efficiency for the first and second light beams passed through the second region is hardly reduced, and the third light beam passed through the second region is not converged.

Optionally, an effective beam diameter of the first light beam on an incident surface of the objective lens may be larger than an effective beam diameter of the second light beam on the incident surface of the objective lens, and the at least one of lens surfaces of the objective lens may include a third region located outside the second region the third region having a diffracting structure having a function of converging only the first light beam. The third region being configured such that a diffraction order at which diffraction efficiency is maximized for the first light beam in the third region is different from a diffraction order at which diffraction efficiency is maximized for the first light beam in the second region.

With this configuration, each of the second and third light beams passing through the third region is diffused.

Alternatively, an effective beam diameter of the second light beam on an incident surface of the objective lens may be larger than an effective beam diameter of the first light beam on the incident surface of the objective lens, and the at least one of lens surfaces of the objective lens may include a third region located outside the second region, the third region having a diffracting structure having a function of converging only the second light beam. The third region is configured such that a diffraction order at which diffraction efficiency is maximized for the second light beam in the third region is different from a diffraction order at which diffraction efficiency is maximized for the second light beam in the second region.

With this configuration, each of the first and third light beams passing through the third region is diffused.

Optionally, the first region may be located on the at least one of lens surfaces of the objective lens to include an optical axis of the objective lens.

Optionally, the first region may be configured to be a continuous surface.

Optionally, with regard to the above mentioned optical pick-up, when wavelengths of the first and third light beams are respectively represented by $\lambda 1$ and $\lambda 3$, and refractive indexes of the objective lens for the first and third light beams are respectively represented by n1 and n3, a following relationship may be satisfied:

$$\lambda1/(n1-1):\lambda3/(n3-1)\cong 1:2 \quad (4).$$

BRIEF DESCRIPTION OF THE ACCOMPANYING DRAWINGS

DETAILED DESCRIPTION OF THE EMBODIMENTS

Hereinafter, an embodiment according to the invention is described with reference to the accompanying drawings.

Figure 1:
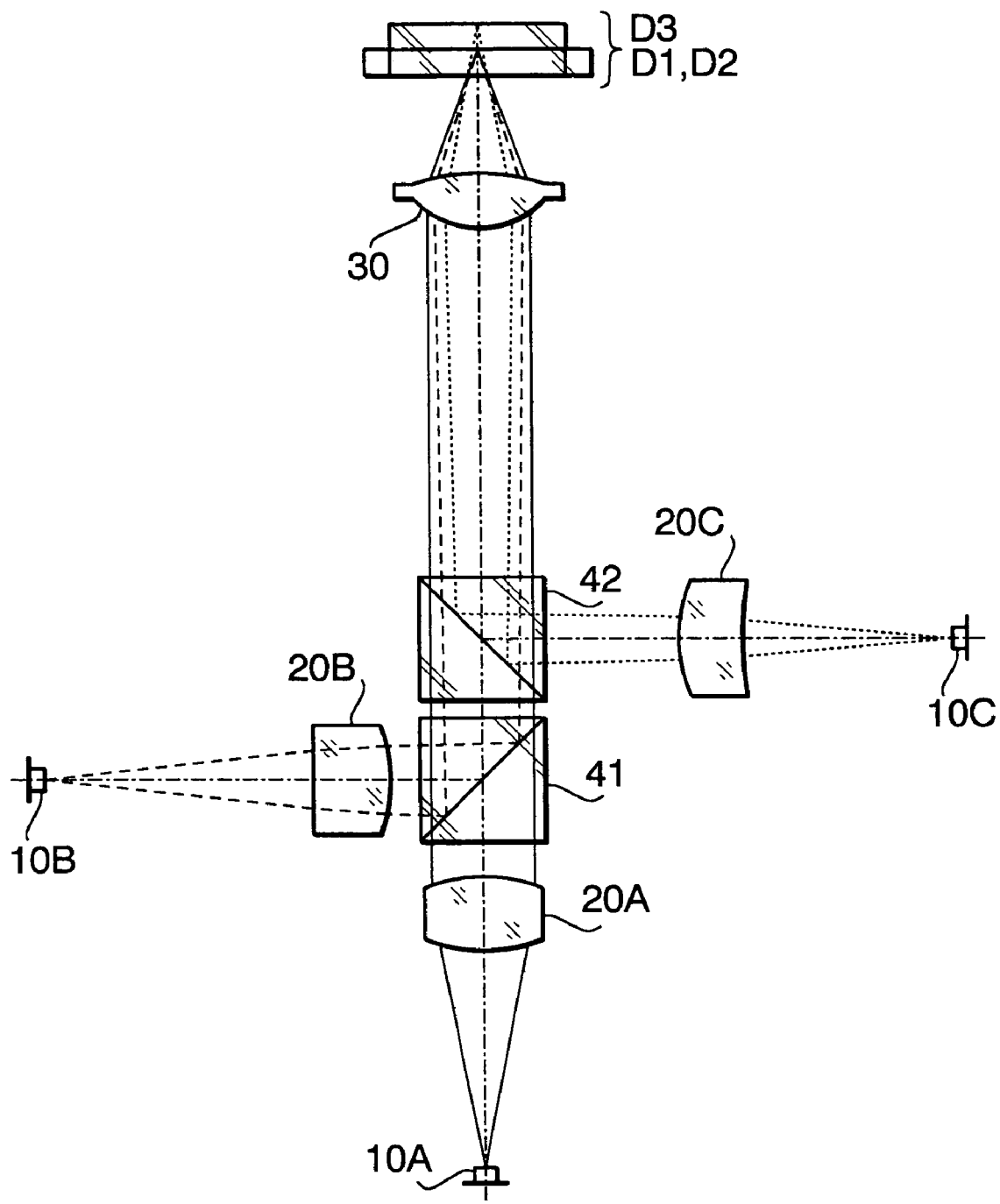
FIG. 1 shows a configuration of an optical pick-up according to an embodiment of the invention.

FIG. 1 shows a configuration of an optical pick-up 100 according to the embodiment of the invention. The optical pick-up 100 is mounted on an optical disc device which is capable of recording data to and/or reproducing data from optical discs D1, D2 and D3, which have different recording densities and different thicknesses of cover layers. In actuality, when recording or reproducing operation is performed, one of optical discs D1, D2 and D3 is placed on a turn table (not shown) in the optical disc device.

In FIG. 1 (and each of FIGS. 2A-2C), a reference axis of the optical pick-up 100 is represented by a chain line, and laser beams emitted by light sources 10A, 10B and 10C are represented by a solid line, a dashed line, and a dotted line, respectively.

In this embodiment, the optical disc D1 has the highest recording density of all of the optical discs D1, D2 and D3. The optical disc D2 has the second highest recording density. The recording density of the optical disc D3 is the lowest of all of the optical discs D1, D2 and D3. The optical disc D1 is, for example, an HD DVD, the optical disc D2 is, for example, a DVD or DVD-R, and the optical disc D3 is, for example, a CD or CD-R.

As shown in FIG. 1, the optical pick-up 100 includes the light sources 10A, 10B and 10C which are respectively used for the optical discs D1, D2 and D3, coupling lenses 20A, 20B and 20C, beam splitters 41 and 42, and an objective lens 30. Laser beams emitted by the light sources 10A, 10B and 10C pass through the coupling lenses 20A, 20B and 20C, respectively, and then are directed to a common optical path by the beam splitters 41 and 42 to be incident on the objective lens 30.

In the following explanation, the laser beam for the optical disc D1 emitted by the light source 10A is represented by a first laser beam, the laser beam for the optical disc D2 emitted by the light source 10B is represented by a second laser beam, and the laser beam for the optical disc D3 emitted by the light source 10C is represented by a third laser beam. The first, second and third laser beams emerged from the beam splitter 42 are converged by the objective lens 30 on data recording layers of the optical discs D1, D2 and D3, respectively.

Figure 2A:
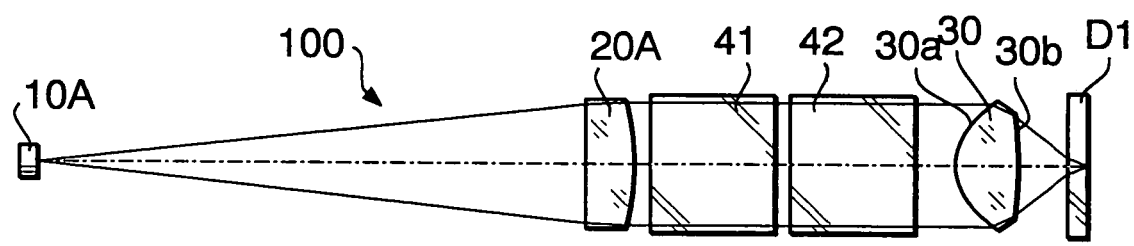
FIG. 2A shows the configuration of the optical pick-up when an optical disc having the highest recording density is used.
Figure 2B:
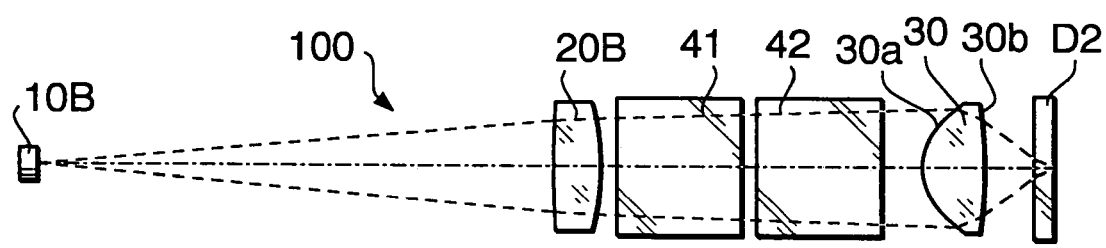
FIG. 2B shows the configuration of the optical pick-up when an optical disc having the second highest recording density is used.
Figure 2C:
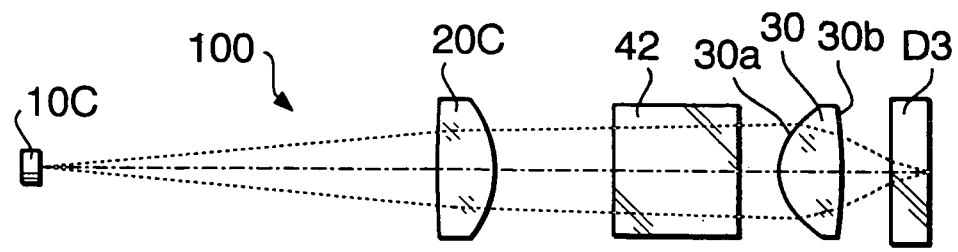
FIG. 2C shows the configuration of the optical pick-up when an optical disc having the lowest recording density is used.

FIGS. 2A, 2B and 2C respectively show the configurations of the optical pick-up 100 when data is recorded to and/or reproduced from the optical discs D1, D2 and D3. As shown in FIG. 2A, when the optical disc D1 is used, the first laser beam emitted by the light source 10A passes through the coupling lens 20A and the beam splitters 41 and 42, and then is converged by the objective lens 30 to form a beam spot suitable for the optical disc D1.

As shown in FIG. 2B, when the optical disc D2 is used, the second laser beam emitted by the light source 10B passes through the coupling lens 20B and the beam splitters 41 and 42, and then is converged by the objective lens 30 to form a beam spot suitable for the optical disc D2. As shown in FIG. 2C, when the optical disc D3 is used, the third laser beam emitted by the light source 10C passes through the coupling lens 20C and the beam splitter 42, and then is converged by the objective lens 30 to form a beam spot suitable for the optical disc D3.

Although in each of FIG. 1 and FIGS. 2A-2C, an optical axis of the objective lens 30 coincides with the reference axis of the optical pick-up 100, there is a case where the optical axis of the objective lens 30 shifts from the reference axis by, for example, a tracking operation.

In this embodiment, given that the thicknesses of cover layers of the optical discs D1, D2 and D3 are represented by t1, t2 and t3, respectively, t1≅0.6 mm, t2≅0.6 mm and t3≅1.2 mm.

It is required to change an NA (numerical aperture) in accordance with the type of the optical disc being used so as to attain required diameters of beam spots suitable for recording data to and/or reproducing data from the optical discs D1, D2 and D3, respectively. Since the optical disc D1 has the highest recording density, the required NA for the optical disc D1 is largest of all of the optical discs D1, D2 and D3. In this embodiment, given that the numerical apertures for recording data to and/or reproducing data from the optical discs D1, D2 and D3 are NA1, NA2 and NA3, respectively, the following relationship holds.

$$NA1 \geq NA2 > NA3$$

The light source 10A is used for recording data to and/or reproducing data from the optical disc D1 having the highest recording density. To form the beam spot having the smallest diameter of all of the beam spots for the optical discs D1, D2 and D3, the light sources 10A is configured to emit the first laser beam having the shortest wavelength of all of wavelengths of the light sources 10A, 10B and 10C. The light source 10C is used for recording data to and/or reproducing data from the optical disc D3 having the lowest recording density. To form the beam spot having the largest diameter of all of the beam spots for the optical discs D1, D2 and D3, the light source 10C is configured to emit the third laser beam having the longest wavelength of all of wavelengths of the light sources 10A, 10B and 10C.

The light source 10B is used for recording data to and/or reproducing data from the optical disc D2 having the relatively high recording density. To form the beam spot having the relatively small diameter, the light source 10B is configured to emit the second laser beam having the second shortest wavelength of all of the wavelengths of the first through third laser beams.

In an example of the configuration shown in FIG. 1, the light sources 10A, 10B and 10C are located at positions different from one another. However, in another example, the light sources 10A, 10B and 10C may be arranged in positional relationships different from that shown in FIG. 1. For example, the light sources 10A, 10B and 10C may be aligned in a line on a common substrate.

The objective lens 30 is a biconvex single element lens made of plastic. The objective lens 30 has a first surface 30a located on a light source side and a second surface 30b. When the thicknesses of the cover layers of the optical discs D1 and D3 (D2 and D3) are different from each other and the wavelengths of the first, second and third laser beams are different from one another, a spherical aberration changes depending on the type of the optical disc being used.

In this embodiment, a collimated beam is incident on the objective lens 30 when the optical disc D1 is used, and a diverging beam is incident on the objective lens 30 when the optical disc D2 or the optical disc D3 is used.

When the optical disc D1 is used, if the objective lens 30 is located on the reference axis of the optical pick-up 100, the first laser beam is converged on the data recording layer of the optical disc D1 with aberrations being substantially equal to zero. However, if the objective lens 30 shifts from the reference axis due to the tracking operation, off-axis light is incident on the objective lens 30, which causes aberrations such as a coma.

In general, tolerance to the aberrations becomes narrow as the required NA becomes large. Therefore, when the optical disc D1 requiring the high NA is used, it is required to sufficiently suppress the aberrations caused by the off-axis light because the tolerance to the aberrations is narrow for the optical disc D1. In this embodiment, when the optical disc D1 is used, the collimated beam is incident on the objective lens 30 so that the aberrations caused by the off-axis light are sufficiently suppressed.

More specifically, the objective lens 30 is configured to satisfy the following condition (1) when the optical disc D1 is used:

$$-0.02 < f1 \times M1 < 0.02 \qquad (1)$$

where f1 represents a focal length of the objective lens 30 when the optical disc D1 is used, M1 represents magnification of the objective lens 30 when the optical disc D1 is used.

By designing the objective lens 30 to satisfy the condition (1), the coma and astigmatism caused by the tracking operation when the optical disc D1 is used are sufficiently suppressed.

In this embodiment, a position of the light source 10A is determined so that the first laser beam is converged to the collimated beam by the coupling lens 20A. That is, the magnification M1 is zero when the optical disc D1 is used. Therefore, in this embodiment the coupling lens 20A functions as a collimator lens for the first laser beam.

Meanwhile, if the objective lens 30 is configured to suppress the aberrations for the optical disc D1, it becomes difficult to sufficiently suppress aberrations caused when the optical disc D2 or D3 is used. For this reason, the diverging beam is used (i.e., the diverging beam is incident on the objective lens 30) for the optical disc D2 or D3 as shown in FIGS. 2B and 2C.

More specifically, the objective lens 30 is configured to satisfy the following condition (2) when the optical disc D2 is used:

$$-0.10 < f2 \times M2 < -0.04 \qquad (2)$$

where f2 represents a focal length of the objective lens 30 when the optical disc D2 is used, M2 represents magnification of the objective lens 30 when the optical disc D2 is used.

Further, the objective lens 30 is configured to satisfy the following condition (3) when the optical disc D3 is used:

$$-0.29 < f3 \times M3 < -0.19 \qquad (3)$$

where f3 represents a focal length of the objective lens 30 when the optical disc D3 is used, M3 represents magnification of the objective lens 30 when the optical disc D3 is used.

By designing the objective lens 30 to satisfy both of the conditions (2) and (3), the spherical aberration caused when the optical disc D2 or the optical disc D3 is used is sufficiently suppressed.

With the above mentioned configuration, the first laser beam passed through the coupling lens 20A and the beam splitters 41 and 42 is converged by the objective lens 30 and forms the beam spot, suitable for recording data to/reproducing data from the optical disc D1, on the data recording layer of the optical disc D1. The second laser beam passed through the coupling lens 20B and the beam splitters 41 and 42 is converged by the objective lens 30 and forms the beam spot, suitable for recording data to/reproducing data from the optical disc D2, on the data recording layer of the optical disc D2. Further, the third laser beam passed through the coupling lens 20C and the beam splitter 42 is converged by the objective lens 30 and forms the beam spot, suitable for recording data to/reproducing data from the optical disc D3, on the data recording layer of the optical disc D3.

In the above explanations, the objective lens 30 is not provided with a diffracting structure. However, the objective lens 30 may additionally be provided with the diffracting structure on at least one of its lens surfaces (30a and 30b). Hereafter, two examples of the objective lens 30 having the diffracting structure will be described with reference to FIGS. 3A and 3B. The diffracting structure has a plurality of concentric annular zones. That is, the diffracting structure has a plurality of concentric ring-shaped minute steps.

Figure 3A:
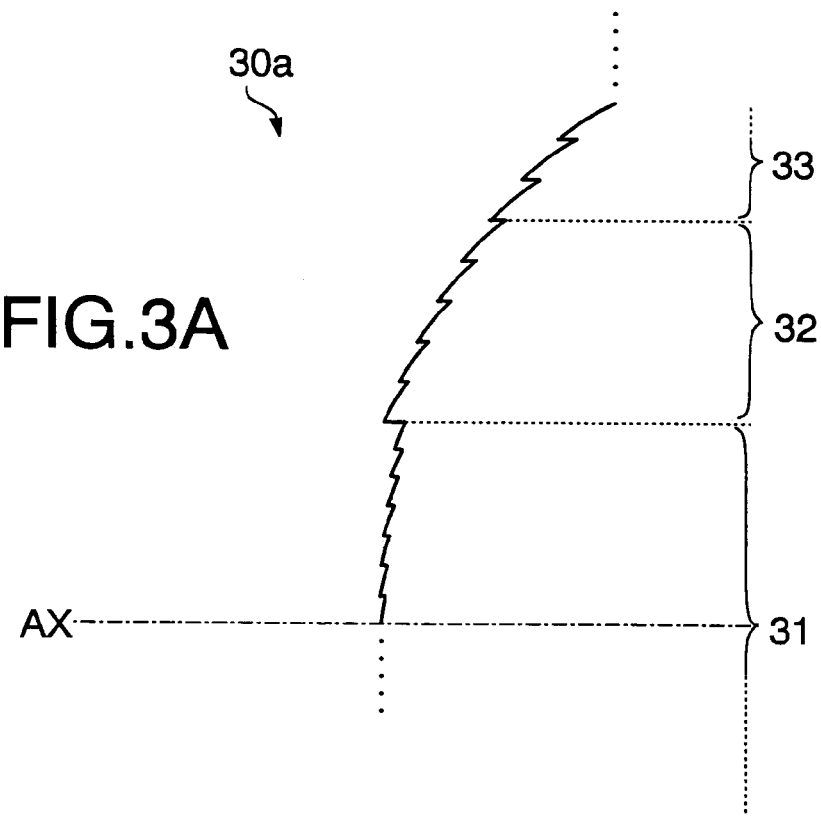
FIG. 3A shows an example of a configuration of an objective lens in the optical pick-up having a diffracting structure in a first, second and third regions on one of its lens surfaces.

FIG. 3A shows a configuration of the objective lens 30 which has the diffracting structure on the first surface 30a. FIG. 3A is a cross sectional view of the objective lens 30 when it is cut by a plane including the optical axis of the objective lens 30. The first surface 30a is configured as follows.

As shown in FIG. 3A, the first surface 30a includes a first region 31 including the optical axis Ax of the objective lens 30, a second region 32 located outside the first region 31, and a third region 33 located outside the second region 32. The third region 33 lies from the outermost portion of the second region 32 to the outermost region of the first surface 30a.

The diffracting structure formed on each of the first, second and third regions 31, 32 and 33 is configured such that, at each step between adjacent annular zones, an optical path difference between the adjacent annular zones is substantially equal to an integral multiple of a certain wavelength.

The diffracting structure formed within the first region 31 has the function of suitably converging the first, second and third laser beams on the data recording layers of the optical discs D1, D2 and D3. The diffracting structure within the first region 31 is configured such that a diffraction order at which diffraction efficiency is maximized is a first order for each of the first, second and third laser beams.

The diffracting structure formed within the second region 32 has the function of suitably converging the first and second laser beams on the data recording layers of the optical discs D1 and D2, respectively, with aberrations being substantially equal to zero. More specifically, the diffracting structure within the second region 32 is configured such that the diffraction order at which the diffraction efficiency is maximized is a third order for the first laser beam, and that the diffraction order at which the diffraction efficiency is maximized is a second order for the second laser beam.

With this structure, a wavefront of the third laser beam passed through the second region 32 does not coincide with a wavefront of the third laser beam passed through the first region 31. That is, the second region 32 does not contribute to the formation of the beam spot for the third laser beam.

The third region is formed on the first surface 30a only when an effective beam diameter of the first laser beam on an incident surface (i.e., the first surface 30a) of the objective lens 30 is different from the effective beam diameter of the second laser beam on the incident surface (i.e., the first surface 30a) of the objective lens 30.

If the effective beam diameter of the first laser beam on the first surface 30a is larger than the effective beam diameter of the second laser beam on the first surface 30a, the third region 33 is configured as follows. In this case, the diffracting structure formed within the third region 33 has the function of suitably converging the first laser beam on the data recording layer of the optical discs D1 with the aberrations being substantially equal to zero. Further, the third region 33 does not contribute to the formation of the beam spot for the second laser beam.

More specifically, in this case the diffracting structure in the third region 33 is configured such that the diffraction order at which the diffraction efficiency for the first laser beam is maximized in the third region 33 is different from the diffraction order at which the diffraction efficiency for the first laser beam is maximized in the second region 32. The third region 33 is blazed so that the diffraction efficiency for the first laser beam is maximized.

If the effective beam diameter of the second laser beam on the first surface 30a is larger than the effective beam diameter of the first laser beam on the first surface 30a, the third region 33 is configured as follows. In this case, the diffracting structure formed within the third region 33 has the function of suitably converging the second laser beam on the data recording layer of the optical discs D2 with the aberrations being substantially equal to zero. Further the third region 33 does not contribute to the formation of the beam spot for the first laser beam.

More specifically, in this case the diffracting structure in the third region 33 is configured such that the diffraction order at which the diffraction efficiency for the second laser beam is maximized in the third region 33 is different from the diffraction order at which the diffraction efficiency for the second laser beam is maximized in the second region 32. The third region 33 is blazed so that the diffraction efficiency for the second laser beam is maximized.

By thus configuring the diffracting structure, the beam spot suitable for recording data to and/or reproducing data from each of the optical discs D1, D2 and D3 is attained.

Figure 3B:
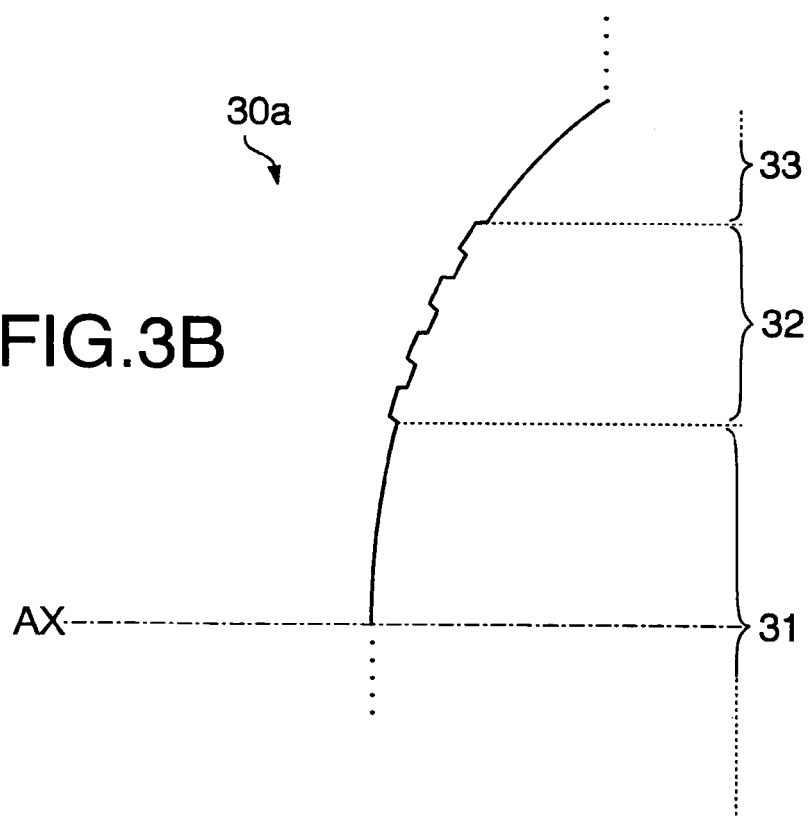
FIG. 3B shows an example of a configuration of the objective lens in the optical pick-up having a diffracting structure in a second region on one of its lens surfaces.

FIG. 3B shows another example of a configuration of the diffracting structure formed on the first surface 30a of the objective lens 30. FIG. 3B is a cross sectional view of the objective lens 30 when it is cut by a plane including the optical axis of the objective lens 30. The first surface 30a is configured as follows.

As shown in FIG. 3B, the first surface 30a includes a first region 31b including the optical axis Ax of the objective lens 30, a second region 32b located outside the first region 31b, and a third region 33b located outside the second region 32b. The third region 33b lies from the outermost portion of the second region 32b to the outermost region of the first surface 30a.

As shown in FIG. 3B, each of the first and third regions 31b and 33b is a continuous surface, and the diffracting structure is formed only in the second region 32b. At each step between adjacent annular zones in the diffracting structure of the second region 32b, a phase difference between the adjacent annular zones is substantially equal to an integral multiple of a certain wavelength.

The second region 32b is configured such that the diffraction efficiency does not decrease for each of the first and second laser beams, and that the second region 32b does not contribute to converging the third laser beam. More specifically, the diffracting structure within the second region 32b is configured such that, at each step between adjacent annular zones (i.e., adjacent refractive surface portions), an additional optical path length for the first laser beam added in the outer annular zone (i.e., the outer refractive surface portion) with respect to the inner annular zone (i.e., the inner refractive surface portion) becomes substantially equal to $3\lambda_1$ or $-3\lambda_1$ ($\lambda_1$: wavelength of the first laser beam).

In this case, the additional optical path length for the second laser beam added in the outer annular zone with respect to the inner annular zone becomes substantially equal to $2\lambda_2$ or $-2\lambda_2$ ($\lambda_2$: wavelength of the second laser beam). Therefore, the diffraction efficiency for the second laser beam does not decrease. With regard to the third laser beam, the additional optical path length for the third laser beam added in the outer annular zone with respect to the inner annular zone becomes substantially equal to $1.5\lambda_3$ or $-1.5\lambda_3$ ($\lambda_3$: wavelength of the third laser beam). Therefore, the third laser beam passed through the second region 32b is divided into first order diffracted light and second order diffracted light. That is, the second region 32b functions as a filter which operates not to converge the third laser beam passing therethrough.

Alternative to the above structure in which the additional optical path length for the first laser beam in the second region 32b is set at $3\lambda_1$ or $-3\lambda_1$, the diffracting structure within the second region 32b may be configured such that, at each step between adjacent annular zones, the additional optical path length for the first laser beam added in the outer annular zone with respect to the inner annular zone is substantially equal to $5\lambda_1$ or $5\lambda_1$.

In this case, the additional optical path length for the second laser beam added in the outer annular zone with respect to the inner annular zone becomes substantially equal to $3\lambda_2$ or $-3\lambda_2$, and therefore the diffraction efficiency for the second laser beam does not decrease. With regard to the third laser beam, the additional optical path length for the third laser beam added in the outer annular zone with respect to the inner annular zone becomes substantially equal to $2.5\lambda_3$ or $-2.5\lambda_3$. Therefore, the third laser beam passed through the second region 32b is divided into second order diffracted light and third order diffracted light. That is, the second region 32b functions as a filter which operates not to converge the third laser beam passing therethrough.

In this embodiment, the following relationship (6) is satisfied:

$$\lambda 1/(n1-1):\lambda 3/(n3-1) \cong 1:2 \quad (4)$$

where $\lambda 1$ represents the wavelength of the first laser beam, n1 represents a refractive index of the objective lens 30 for the first laser beam, $\lambda 3$ represents the wavelength of the third laser beam, and n3 represents a refractive index of the objective lens 30 for the third laser beam.

When the relationship (4) holds, if the aberrations are substantially completely corrected with regard to the use for the optical disc D1 by configuring the optical system 100 so that the collimated beam is incident on the objective lens 30, it is possible to correct the spherical aberration for each of the optical discs D2 and D3 by configuring the optical system 100 so that the diverging beam is incident on the objective lens 30 for each of the optical disc D2 and D3. It is also possible to correct the spherical aberration for each of the optical discs D2 and D3 by use of the diffracting structure, which may be additionally formed on the objective lens 30 and the adjustment of the magnification of the objective lens 30.

The optical pick-up 100 (the objective lens 30) has compatibility for various types of optical discs having the relationship (4).

Hereafter, four concrete examples will be described. In the following examples, the thickness of the cover layer of each of the optical disc D1 and D2 is 0.6 mm, and the thickness of the cover layer of the optical disc D3 is 1.2 mm.

FIRST EXAMPLE

The optical pick-up 100 according to a first example has the configuration shown in FIGS. 1 and 2. In the first example, the objective lens 30 does not have the diffracting structure. Performance specifications of the objective lens 30 according to the first example are shown in Table 1.

TABLE 1

|  | First laser beam | Second laser beam | Third laser beam |
| --- | --- | --- | --- |
| Design wavelength | 405 nm | 657 nm | 788 nm |
| f Focal length | 2.850 mm | 2.944 mm | 2.961 mm |
| NA | 0.700 | 0.650 | 0.500 |
| magnification | 0.000 | −0.024 | −0.083 |

In Table 1 (and in the following similar Tables), a design wavelength means a wavelength suitable for the recordation/reproduction of the optical disc, f represents a focal length (unit: mm) of the objective lens 30, NA represents the numerical aperture on the object side. In Table 1, the performance specifications are indicated with regard to each of the first laser beam (the optical disc D1), the second laser beam (the optical disc D2) and the third laser beam (the optical disc D3).

Table 2 shows a numerical configuration of the optical pick-up 100 when the optical disc D1 (the first laser beam) is used, Table 3 shows a numerical configuration of the optical pick-up 100 when the optical disc D2 (the second laser beam) is used, and Table 4 shows a numerical configuration of the optical pick-up 100 when the optical disc D3 (the third laser beam) is used.

TABLE 2

| Surface Number | r | d | n (405 nm) | n (657 nm) | n (788 nm) |
| --- | --- | --- | --- | --- | --- |
| #0 |  | 17.10 |  |  |  |
| #1 | 159.120 | 1.50 | 1.56023 | 1.54056 | 1.53657 |
| #2 | −10.730 | 1.00 |  |  |  |
| #3 | ∞ | 4.00 | 1.52972 | 1.51383 | 1.51056 |
| #4 | ( | 1.00 |  |  |  |
| #5 | ( | 4.00 | 1.52972 | 1.51383 | 1.51056 |
| #6 | ( | 2.85 |  |  |  |
| #7 | 1.805 | 2.30 | 1.52469 | 1.50645 | 1.50316 |
| #8 | −4.895 | 1.23 |  |  |  |
| #9 | ( | 0.60 | 1.62231 | 1.57982 | 1.57315 |
| #10 | ( | — |  |  |  |

TABLE 3

| Surface Number | r | d | n (405 nm) | n (657 nm) | n (788 nm) |
| --- | --- | --- | --- | --- | --- |
| #0 |  | 14.19 |  |  |  |
| #1 | −167.780 | 1.50 | 1.56023 | 1.54056 | 1.53657 |
| #2 | −8.980 | 1.00 |  |  |  |
| #3 | ( | 4.00 | 1.52972 | 1.51383 | 1.51056 |
| #4 | ( | 1.00 |  |  |  |
| #5 | ( | 4.00 | 1.52972 | 1.51383 | 1.51056 |
| #6 | ( | 2.71 |  |  |  |
| #7 | 1.805 | 2.30 | 1.52469 | 1.50645 | 1.50316 |
| #8 | −4.895 | 1.37 |  |  |  |
| #9 | ( | 0.60 | 1.62231 | 1.57982 | 1.57315 |
| #10 | ( | — |  |  |  |

TABLE 4

| Surface Number | r | d | n (405 nm) | n (657 nm) | n (788 nm) |
|---|---|---|---|---|---|
| #0 | | 9.27 | | | |
| #1 | -18.100 | 1.50 | 1.56023 | 1.54056 | 1.53657 |
| #2 | -6.270 | 4.46 | | | |
| #3 | ( | 4.00 | 1.52972 | 1.51383 | 1.51056 |
| #4 | ∞ | 2.90 | | | |
| #5 | 1.805 | 2.30 | 1.52469 | 1.50645 | 1.50316 |
| #6 | -4.895 | 1.18 | | | |
| #7 | ∞ | 1.20 | 1.62231 | 1.57982 | 1.57315 |
| #8 | ∞ | — | | | |

In Tables 2-4, "surface number" represents a surface number of each surface of optical components in the optical pick-up 100 shown in FIGS. 2A-2C. In Table 2, a surface #0 represents the light source 10A, surfaces #1 and #2 represent a front surface (a light source side surface) and a rear surface (an objective lens side surface) of the coupling lens 20A, respectively, and surfaces #9 and #10 represent the cover layer and the data recording layer of the optical disc D1, respectively. In Table 3, a surface #0 represents the light source 10B, surfaces #1 and #2 represent a front surface (a light source side surface) and a rear surface (an objective lens side surface) of the coupling lens 20B, respectively, and surfaces #9 and #10 represent the cover layer and the recording layer of the optical disc D2, respectively.

In each of Tables 2 and 3, surfaces #3 and #4 represent a front surface and a rear surface of the beam splitter 41, respectively, surfaces #5 and #6 represent a front surface and a rear surface of the beam splitter 42, respectively, and surfaces #7 and #8 represent the first surface 30a and the second surface 30b of the objective lens 30, respectively.

In Table 4, a surface #0 represents the light source 10C, and surfaces #1 and #2 represent a front surface (a light source side surface) and a rear surface (an objective lens side surface) of the coupling lens 20C, respectively. Surfaces #3 and #4 represent the front surface and the rear surface of the beam splitter 42, respectively. Surfaces #5 and #6 represent the first surface 30a and the second surface 30b of the objective lens 30, respectively. Surfaces #7 and #8 represent the cover layer and the data recording layer of the optical disc D3, respectively.

In Tables 2-4 (and in the following similar Tables), "r" represents a radius of curvature (unit: mm) of each lens surface on the optical axis, "d" represents a thickness of a lens or a distance (unit: mm) from a lens surface to a next lens surface and "n" represents a refractive index which is indicated for each of wavelengths of the first, second and third laser beams.

Each of the rear surface (#2) of the coupling lens 20A, the rear surface (#2) of the coupling lens 20B, the rear surface (#2) of the coupling lens 20C and the first and second surfaces 30a and 30b of the objective lens 30 is an aspherical surface. The aspherical surface is expressed by a following equation:

$$X(h) = \frac{ch^2}{1 + \sqrt{1 - (1+K)c^2 h^2}} + A_4 h^4 + A_6 h^6 + A_8 h^8 + A_{10} h^{10} + A_{12} h^{12} + \cdots$$

where, X(h) represents a SAG amount which is a distance between a point on the aspherical surface at a height of h from the optical axis and a plane tangential to the aspherical surface at the optical axis, symbol c represents curvature (1/r) on the optical axis, K is a conical coefficient, and $A_4$, $A_6$, $A_8$, $A_{10}$ and $A_{12}$ are aspherical coefficients of fourth, sixth, eighth, tenth and twelfth orders, respectively.

Table 5 shows the conical coefficient and aspherical coefficients of the rear surface (#2) of the coupling lens 20A and the first and second surfaces 30a and 30b (#7 and #8) of the objective lens 30 when the recording and/or reproducing operation for the optical disc D1 is performed. Table 6 shows the conical coefficient and aspherical coefficients of the rear surface (#2) of the coupling lens 20B and the first and second surfaces 30a and 30b (#7 and #8) of the objective lens 30 when the recording and/or reproducing operation for the optical disc D2 is performed. Table 7 shows the conical coefficient and aspherical coefficients of the rear surface (#2) of the coupling lens 20C and the first and second surfaces 30a and 30b (#5 and #6) of the objective lens 30 when the recording and/or reproducing operation for the optical disc D3 is performed.

TABLE 5

| Surface No. | #2 | #7 | #8 |
|---|---|---|---|
| K | 0.0000 | -0.8300 | 0.0000 |
| A4 | 6.8926E-05 | 6.9870E-03 | 4.3077E-02 |
| A6 | 4.5010E-07 | 9.4430E-04 | -2.0300E-02 |
| A8 | 2.5560E-09 | -4.3980E-04 | 1.0910E-02 |
| A10 | 1.5860E-11 | 3.9100E-04 | -5.1250E-03 |
| A12 | 0.0000E+00 | -1.5970E-04 | 1.8680E-03 |
| A14 | 0.0000E+00 | 3.4880E-05 | -4.8970E-04 |
| A16 | 0.0000E+00 | -3.0900E-06 | 7.8020E-05 |
| A18 | 0.0000E+00 | 0.0000E+00 | -5.4635E-06 |

TABLE 6

| Surface No. | #2 | #7 | #8 |
|---|---|---|---|
| K | 0.0000 | -0.8300 | 0.0000 |
| A4 | 7.8637E-05 | 6.9870E-03 | 4.3077E-02 |
| A6 | 8.1710E-07 | 9.4430E-04 | -2.0300E-02 |
| A8 | 7.5050E-09 | -4.3980E-04 | 1.0910E-02 |
| A10 | 7.9200E-11 | 3.9100E-04 | -5.1250E-03 |
| A12 | 0.0000E+00 | -1.5970E-04 | 1.8680E-03 |
| A14 | 0.0000E+00 | 3.4880E-05 | -4.8970E-04 |
| A16 | 0.0000E+00 | -3.0900E-06 | 7.8020E-05 |
| A18 | 0.0000E+00 | 0.0000E+00 | -5.4635E-06 |

TABLE 7

| Surface No. | #2 | #5 | #6 |
|---|---|---|---|
| K | 0.0000 | -0.8300 | 0.0000 |
| A4 | 7.5290E-05 | 6.9870E-03 | 4.3077E-02 |
| A6 | 1.8960E-06 | 9.4430E-04 | -2.0300E-02 |
| A8 | 4.1040E-08 | -4.3980E-04 | 1.0910E-02 |
| A10 | 1.2584E-09 | 3.9100E-04 | -5.1250E-03 |
| A12 | 0.0000E+00 | -1.5970E-04 | 1.8680E-03 |
| A14 | 0.0000E+00 | 3.4880E-05 | -4.8970E-04 |
| A16 | 0.0000E+00 | -3.0900E-06 | 7.8020E-05 |
| A18 | 0.0000E+00 | 0.0000E+00 | -5.4635E-06 |

In Tables 5-7 (and in the following similar Tables), a notation symbol E indicates that 10 is used as a radix and a right side value of E is used as an exponent.

In the first example, f1×M1 is 0.000, f2×M2 is -0.071 and f3×M3 is -0.246. Therefore, the conditions (1), (2) and (3)

are satisfied. As can be seen from Tables 1 and 2, λ1/(n1−1):λ3/(n3−1) is 1:2. Therefore, the relationship (4) is also satisfied.

Figure 6:
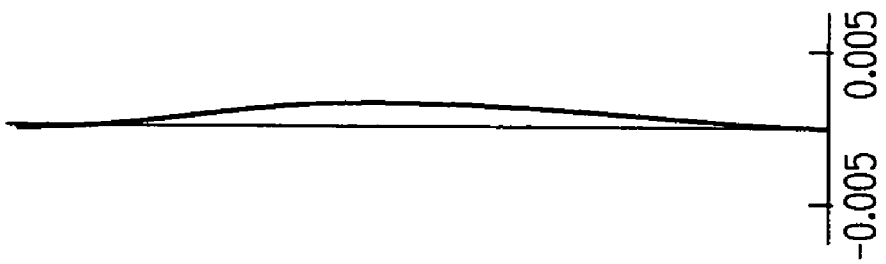
FIG. 6 is a graph illustrating the spherical aberration caused in the optical pick-up of the first example when a third laser beam passes through the objective lens.
Figure 5:
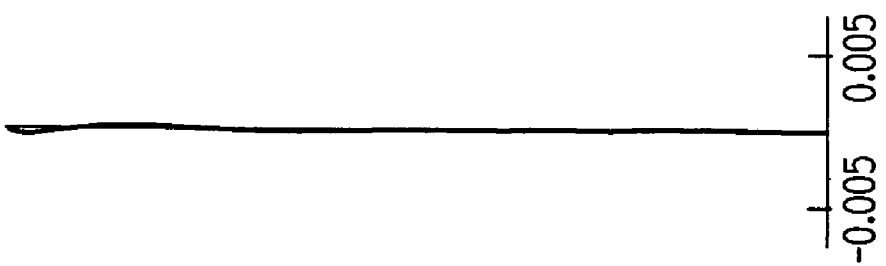
FIG. 5 is a graph illustrating the spherical aberration caused in the optical pick-up of the first example when a second laser beam passes through the objective lens.
Figure 4:
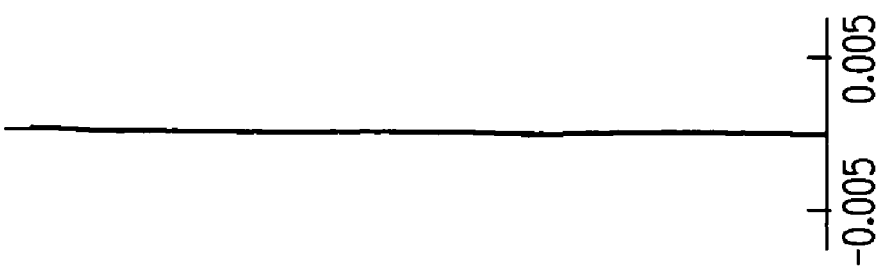
FIG. 4 is a graph illustrating a spherical aberration caused in the optical pick-up of a first example when a first laser beam passes through the objective lens.

FIG. 4 is a graph illustrating the spherical aberration caused in the optical pick-up 100 of the first example when the first laser beam passes through the objective lens 30 (i.e., when the optical disc D1 is used). FIG. 5 is a graph illustrating the spherical aberration caused in the optical pick-up 100 of the first example when the second laser beam passes through the objective lens 30 (i.e., when the optical disc D2 is used). FIG. 6 is a graph illustrating the spherical aberration caused in the optical pick-up 100 of the first example when the third laser beam passes through the objective lens 30 (i.e., when the optical disc D3 is used).

As shown in FIGS. 4-6, according to the optical pick-up 100 configured to have the relationship (4) and to satisfy the conditions (1), (2) and (3), the spherical aberration is sufficiently corrected for each of the optical discs D1, D2 and D3. Therefore, the beam spots suitable for the recording and/or reproducing operation of optical discs D1, D2 and D3 are formed on the data recording layers of the optical discs D1, D2 and D3, respectively.

SECOND EXAMPLE

The optical pick-up 100 according to a second example has the configuration shown in FIGS. 1 and 2. In the second example, the diffracting structure is formed in the first, second and third regions 31-33 on the first surface 30a of the objective lens 30. Performance specifications of the objective lens 30 according to the second example are shown in Table 8.

TABLE 8

|  | First laser beam | Second laser beam | Third laser beam |
|---|---|---|---|
| Design wavelength | 405 nm | 657 nm | 785 nm |
| f Focal length | 2.999 mm | 3.104 mm | 3.126 mm |
| NA | 0.650 | 0.601 | 0.500 |
| magnification | 0.000 | −0.014 | −0.083 |

Table 9 shows a numerical configuration of the optical pick-up 100 when the optical disc D1 (the first laser beam) is used, Table 10 shows a numerical configuration of the optical pick-up 100 when the optical disc D2 (the second laser beam) is used, and Table 11 shows a numerical configuration of the optical pick-up 100 when the optical disc D3 (the third laser beam) is used.

TABLE 9

| Surface Number | r | d | n (405 nm) | n (657 nm) | n (785 nm) |
|---|---|---|---|---|---|
| #0 |  | 17.10 |  |  |  |
| #1 | 159.120 | 1.50 | 1.56023 | 1.54056 | 1.53665 |
| #2 | −10.730 | 1.00 |  |  |  |
| #3 | ∞ | 4.00 | 1.52972 | 1.51383 | 1.51062 |
| #4 | ∞ | 1.00 |  |  |  |
| #5 | ∞ | 4.00 | 1.52972 | 1.51383 | 1.51062 |
| #6 | ∞ | 2.84 |  |  |  |
| #7 (1st region) | 1.935 | 1.95 | 1.56023 | 1.54056 | 1.53665 |
| #7 (2nd region) | 1.932 |  |  |  |  |
| #7 (3rd region) | 1.908 |  |  |  |  |

TABLE 9-continued

| Surface Number | r | d | n (405 nm) | n (657 nm) | n (785 nm) |
|---|---|---|---|---|---|
| #8 | −8.129 | 1.54 |  |  |  |
| #9 | ∞ | 0.60 | 1.62231 | 1.57982 | 1.57326 |
| #10 | ∞ | — |  |  |  |

TABLE 10

| Surface Number | r | d | n (405 nm) | n (657 nm) | n (785 nm) |
|---|---|---|---|---|---|
| #0 |  | 15.54 |  |  |  |
| #1 | ( | 1.50 | 1.56023 | 1.54056 | 1.53665 |
| #2 | −9.685 | 1.00 |  |  |  |
| #3 | ( | 4.00 | 1.52972 | 1.51383 | 1.51062 |
| #4 | ( | 1.00 |  |  |  |
| #5 | ( | 4.00 | 1.52972 | 1.51383 | 1.51062 |
| #6 | ( | 2.71 |  |  |  |
| #7 (1st region) | 1.935 | 1.95 | 1.56023 | 1.54056 | 1.53665 |
| #7 (2nd region) | 1.932 |  |  |  |  |
| #7 (3rd region) | 1.908 |  |  |  |  |
| #8 | −8.129 | 1.67 |  |  |  |
| #9 | ( | 0.60 | 1.62231 | 1.57982 | 1.57326 |
| #10 | ( | — |  |  |  |

TABLE 11

| Surface Number | r | d | n (405 nm) | n (657 nm) | n (78 nm) |
|---|---|---|---|---|---|
| #0 |  | 10.68 |  |  |  |
| #1 | −27.120 | 1.50 | 1.56023 | 1.54056 | 1.53665 |
| #2 | −7.050 | 4.45 |  |  |  |
| #3 | ( | 4.00 | 1.52972 | 1.51383 | 1.51062 |
| #4 | ( | 2.90 |  |  |  |
| #5 (1st region) | 1.935 | 1.95 | 1.56023 | 1.54056 | 1.53665 |
| #5 (2nd region) | 1.932 |  |  |  |  |
| #5 (3rd region) | 1.908 |  |  |  |  |
| #6 | −8.129 | 1.48 |  |  |  |
| #7 | ( | 1.20 | 1.62231 | 1.57982 | 1.57326 |
| #8 | ( | — |  |  |  |

In Tables 9-11, "surface number" represents a surface number of each surface of optical components in the optical pick-up 100 shown in FIGS. 2A-2C. In Table 9, a surface #0 represents the light source 10A, surfaces #1 and #2 represent a front surface (a light source side surface) and a rear surface (an objective lens side surface) of the coupling lens 20A, respectively, and surfaces #9 and #10 represent the cover layer and the data recording layer of the optical disc D1, respectively. In Table 10, a surface #0 represents the light source 10B, surfaces #1 and #2 represent a front surface (a light source side surface) and a rear surface (an objective lens side surface) of the coupling lens 20B, respectively, and surfaces #9 and #10 represent the cover layer and the recording layer of the optical disc D2, respectively.

In each of Tables 9 and 10, surfaces #3 and #4 represent a front surface and a rear surface of the beam splitter 41, respectively, surfaces #5 and #6 represent a front surface and a rear surface of the beam splitter 42, respectively, and surfaces #7 and #8 represent the first surface 30a and the second surface 30b of the objective lens 30, respectively.

In Table 11, a surface #0 represents the light source 10C, and surfaces #1 and #2 represent a front surface (a light source side surface) and a rear surface (an objective lens side surface) of the coupling lens 20C, respectively. Surfaces #3 and #4 represent the front surface and the rear surface of the beam splitter 42, respectively. Surfaces #5 and #6 represent the first surface 30a and the second surface 30b of the objective lens 30, respectively. Surfaces #7 and #8 represent the cover layer and the data recording layer of the optical disc D3, respectively.

the objective lens 30 when the recording and/or reproducing operation for the optical disc D1 is performed. Table 13 shows the conical coefficient and aspherical coefficients of the rear surface (#2) of the coupling lens 20B and the first and second surfaces 30a and 30b (#7 and #8) of the objective lens 30 when the recording and/or reproducing operation for the optical disc D2 is performed. Table 14 shows the conical coefficient and aspherical coefficients of the rear surface (#2) of the coupling lens 20C and the first and second surfaces 30a and 30b (#5 and #6) of the objective lens 30 when the recording and/or reproducing operation for the optical disc D3 is performed.

TABLE 12

| Surface No. | #2 | #7 (1st region) | #7 (2nd region) | #7 (3rd region) | #8 |
|---|---|---|---|---|---|
| K | 0.0000 | −0.6400 | −0.6400 | −0.6400 | 0.0000 |
| A4 | 6.8926E−05 | 2.1310E−03 | 2.0360E−03 | 2.1630E−04 | 1.6700E−02 |
| A6 | 4.5010E−07 | 2.3610E−04 | −1.0750E−04 | 5.5900E−04 | −3.1670E−03 |
| A8 | 2.5560E−09 | 3.3090E−05 | 1.5290E−04 | −1.6410E−04 | 4.6280E−04 |
| A10 | 1.5860E−11 | −1.6590E−06 | −4.2280E−05 | 1.9610E−05 | −2.2510E−05 |
| A12 | 0.0000E+00 | 1.2231E−06 | 5.4917E−06 | 8.5350E−07 | −1.6506E−06 |

TABLE 13

| Surface No. | #2 | #7 (1st region) | #7 (2nd region) | #7 (3rd region) | #8 |
|---|---|---|---|---|---|
| K | 0.0000 | −0.6400 | −0.6400 | −0.6400 | 0.0000 |
| A4 | 7.4560E−05 | 2.1310E−03 | 2.0360E−03 | 2.1630E−04 | 1.6700E−02 |
| A6 | 6.3820E−07 | 2.3610E−04 | −1.0750E−04 | 5.5900E−04 | −3.1670E−03 |
| A8 | 4.8110E−09 | 3.3090E−05 | 1.5290E−04 | −1.6410E−04 | 4.6280E−04 |
| A10 | 4.0840E−11 | −1.6590E−06 | −4.2280E−05 | 1.9610E−05 | −2.2510E−05 |
| A12 | 0.0000E+00 | 1.2231E−06 | 5.4917E−06 | 8.5350E−07 | −1.6506E−06 |

TABLE 14

| Surface No. | #2 | #5 (1st region) | #5 (2nd region) | #5 (3rd region) | #6 |
|---|---|---|---|---|---|
| K | 0.0000 | −0.6400 | −0.6400 | −0.6400 | 0.0000 |
| A4 | 7.6440E−05 | 2.1310E−03 | 2.0360E−03 | 2.1630E−04 | 1.6700E−02 |
| A6 | 1.4620E−06 | 2.3610E−04 | −1.0750E−04 | 5.5900E−04 | −3.1670E−03 |
| A8 | 2.4540E−08 | 3.3090E−05 | 1.5290E−04 | −1.6410E−04 | 4.6280E−04 |
| A10 | 5.3440E−10 | −1.6590E−06 | −4.2280E−05 | 1.9610E−05 | −2.2510E−05 |
| A12 | 0.0000E+00 | 1.2231E−06 | 5.4917E−06 | 8.5350E−07 | −1.6506E−06 |

As shown in Tables 9-11, the first surface 30a of the objective lens 30 is divided into the first region 31, the second region 32 and the third region 33, each of which has the diffracting structure. That is, the first surface 30a of the objective lens 30 is configured to have the configuration shown in FIG. 3A. A range within which each of the first, second and third regions 31-33 is formed is represented as follows, using a height h (mm) from the optical axis.

First region 31: $h \leq 1.53$
Second region 32: $1.53 < h \leq 1.89$
Third region 33: $1.89 < h \leq 1.95$ Each of the rear surface (#2) of the coupling lens 20A, the rear surface (#2) of the coupling lens 20B, the rear surface (#2) of the coupling lens 20C and the first and second surfaces 30a and 30b of the objective lens 30 is an aspherical surface.

Table 12 shows the conical coefficient and aspherical coefficients of the rear surface (#2) of the coupling lens 20A and the first and second surfaces 30a and 30b (#7 and #8) of As shown in Tables 12-14, aspherical shapes of the first, second and third regions 31-33 of the first surface 30a are different from one another.

The diffracting structure (which is formed on the front surface 30a of the objective lens 30 in this example) is expressed by an optical path difference function $\Phi(h)$:

$$\Phi(h) = (P_2 h^2 + P_4 h^4 + P_6 h^6 + \ldots) \times m \times \lambda$$

where $P_2$, $P_4$ and $P_6$ are coefficients of second, fourth and sixth orders, h represents a height from the optical axis, m represents a diffraction order, and $\lambda$ represents a working wavelength. The optical path difference $\Phi(h)$ indicates a difference of an optical path length of a hypothetical ray of light which does not pass through the diffractive lens structure and an optical path length of a ray of light which is diffracted by the diffraction lens structure, at the height h from the optical axis. In other words, the optical path difference $\Phi(h)$ represents the additional optical path length of each ray of light which is diffracted by the diffractive lens structure. "m" represents the diffraction order at which the diffraction efficiency takes the maximum value.

Table 15 shows values of the coefficients of the optical path difference function Φ(h) applied to the diffracting structure formed on each of the first, second and third regions 31-33 of the first surface 30a of the objective lens 30.

TABLE 15

| coefficient | First Region 31 | Second Region 32 | Third Region 33 |
|---|---|---|---|
| P2 | 1.1900E−01 | 2.2460E−01 | 5.1170E+00 |
| P4 | −5.1950E−02 | −1.1300E−01 | −1.8850E+00 |
| P6 | −4.5030E−02 | −7.2670E−02 | −2.1500E−01 |
| P8 | 0.0000E+00 | −3.8370E−03 | −4.3950E−03 |
| P10 | 0.0000E+00 | 0.0000E+00 | 0.0000E+00 |
| P12 | 0.0000E+00 | 0.0000E+00 | 0.0000E+00 |

Table 16 shows the diffraction order m (at which the diffraction efficiency is maximized) in each of the first, second and third regions 31-33. The diffraction orders m are indicated for each of the first, second and third laser beams in Table 16.

TABLE 16

| m | First laser | Second Laser | Third Laser |
|---|---|---|---|
| First region 31 | 1st | 1st | 1st |
| Second region 32 | 3rd | 2nd | — |
| Third region 33 | 1st | — | — |

With regard to the objective lens 30 in the optical pick-up 100 according to the second example, f1×M1 is 0.000, f2×M2 is −0.043, and f3×M3 is −0.216. Therefore, the conditions (1), (2) and (3) are satisfied. As can be seen from Tables 8 and 9, λ1/(n1−1): λ3/(n3−1) is 1:2. Therefore, the relationship (4) is also satisfied.

Figure 9:
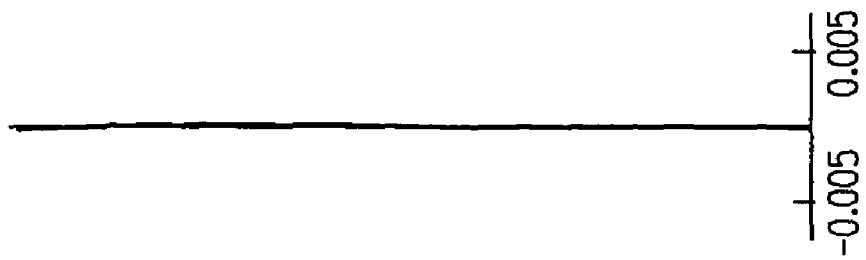
FIG. 9 is a graph illustrating the spherical aberration caused in the optical pick-up of the second example when the third laser beam passes through the objective lens.
Figure 8:
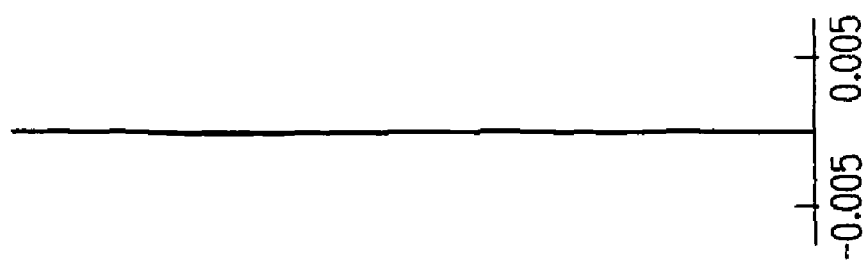
FIG. 8 is a graph illustrating the spherical aberration caused in the optical pick-up of the second example when the second laser beam passes through the objective lens.
Figure 7:
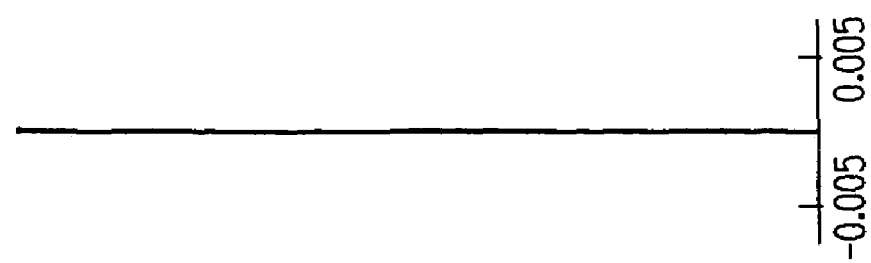
FIG. 7 is a graph illustrating the spherical aberration caused in the optical pick-up of a second example when the first laser beam passes through the objective lens.

FIG. 7 is a graph illustrating the spherical aberration caused in the optical pick-up 100 of the second example when the first laser beam passes through the objective lens 30 (i.e., when the optical disc D1 is used). FIG. 8 is the graph illustrating a spherical aberration caused in the optical pick-up 100 of the second example when the second laser beam passes through the objective lens 30 (i.e., when the optical disc D2 is used). FIG. 9 is the graph illustrating a spherical aberration caused in the optical pick-up 100 of the second example when the third laser beam passes through the objective lens 30 (i.e., when the optical disc D3 is used).

As shown in FIGS. 7-9, according to the optical pick-up 100 configured to have the relationship (4) and to satisfy the conditions (1), (2) and (3), the spherical aberration is sufficiently corrected for each of the optical discs D1, D2 and D3. Therefore, the beam spots suitable for the recording and/or reproducing operation of optical discs D1, D2 and D3 are formed on the data recording layers of the optical discs D1, D2 and D3, respectively.

THIRD EXAMPLE

Figure 10A:
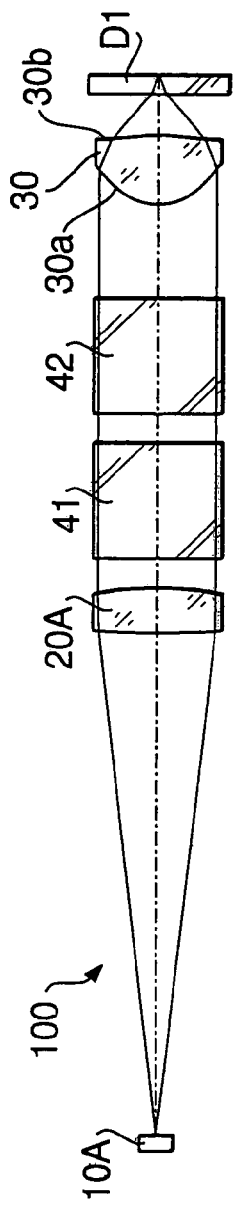
FIG. 10A shows the configuration of the optical pick-up when the optical disc having the highest recording density is used in a third or fourth example.
Figure 10B:
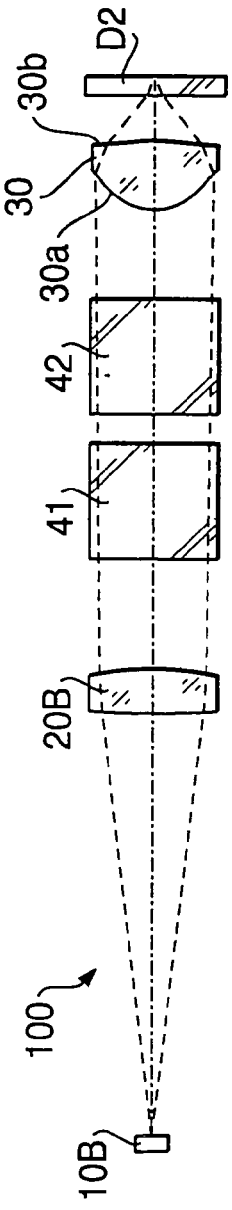
FIG. 10B shows the configuration of the optical pick-up when the optical disc having the second highest recording density is used in the third or fourth example.
Figure 10C:
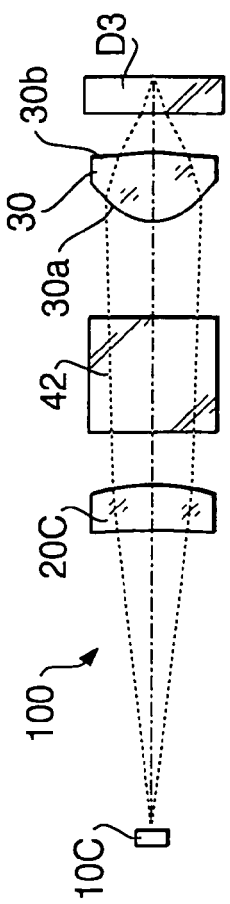
FIG. 10C shows the configuration of the optical pick-up when the optical disc having the lowest recording density is used in the third or fourth example.

The optical pick-up 100 according to a third example has the configuration shown in FIG. 1. FIG. 10A is the configuration of the optical pick-up 100 when the optical disc D1 is used. FIG. 10B is the configuration of the optical pick-up 100 when the optical disc D2 is used. FIG. 10C is the configuration of the optical pick-up 100 when the optical disc D3 is used. In the third example, the diffracting structure is formed in the second region 32b on the first surface 30a of the objective lens 30. Performance specifications of the objective lens 30 according to the third example are shown in Table 17.

TABLE 17

| | First laser beam | Second laser beam | Third laser beam |
|---|---|---|---|
| Design wavelength | 405 nm | 657 nm | 788 nm |
| f Focal length | 3.000 mm | 3.100 mm | 3.118 mm |
| NA | 0.650 | 0.612 | 0.500 |
| magnification | 0.000 | −0.023 | −0.083 |

Table 18 shows a numerical configuration of the optical pick-up 100 when the optical disc D1 (the first laser beam) is used, Table 19 shows a numerical configuration of the optical pick-up 100 when the optical disc D2 (the second laser beam) is used, and Table 20 shows a numerical configuration of the optical pick-up 100 when the optical disc D3 (the third laser beam) is used.

TABLE 18

| Surface No. | r | d | n(405 nm) | n(657 nm) | n(788 nm) |
|---|---|---|---|---|---|
| #0 | | 17.10 | | | |
| #1 | 97.680 | 1.50 | 1.52469 | 1.50645 | 1.50316 |
| #2 | −10.400 | 1.00 | | | |
| #3 | ∞ | 4.00 | 1.52972 | 1.51383 | 1.51056 |
| #4 | ∞ | 1.00 | | | |
| #5 | ∞ | 4.00 | 1.52972 | 1.51383 | 1.51056 |
| #6 | ∞ | 3.15 | | | |
| #7 | 1.877 | 2.30 | 1.52469 | 1.50645 | 1.50316 |
| #8 | −5.641 | 1.37 | | | |
| #9 | ∞ | 0.60 | 1.62231 | 1.57982 | 1.57315 |
| #10 | ∞ | — | | | |

TABLE 19

| Surface No. | r | d | n(405 nm) | n(657 nm) | n(788 nm) |
|---|---|---|---|---|---|
| #0 | | 14.77 | | | |
| #1 | −1023.000 | 1.50 | 1.52469 | 1.50645 | 1.50316 |
| #2 | −9.040 | 3.78 | | | |
| #3 | ∞ | 4.00 | 1.52972 | 1.51383 | 1.51056 |
| #4 | ∞ | 1.00 | | | |
| #5 | ∞ | 4.00 | 1.52972 | 1.51383 | 1.51056 |
| #6 | ∞ | 3.01 | | | |
| #7 | 1.877 | 2.30 | 1.52469 | 1.50645 | 1.50316 |
| #8 | −5.641 | 1.51 | | | |
| #9 | ∞ | 0.60 | 1.62231 | 1.57982 | 1.57315 |
| #10 | ∞ | — | | | |

TABLE 20

| Surface No. | r | d | n(405 nm) | n(657 nm) | n(788 nm) |
|---|---|---|---|---|---|
| #0 | | 10.27 | | | |
| #1 | −28.000 | 1.50 | 1.52469 | 1.50645 | 1.50316 |
| #2 | −6.670 | 1.91 | | | |
| #3 | ∞ | 4.00 | 1.52972 | 1.51383 | 1.51056 |
| #4 | ∞ | 3.20 | | | |
| #5 | 1.877 | 2.30 | 1.52469 | 1.50645 | 1.50316 |
| #6 | −5.641 | 1.32 | | | |
| #7 | ∞ | 1.20 | 1.62231 | 1.57982 | 1.57315 |
| #8 | ∞ | — | | | |

In Tables 18-20, "surface number" represents a surface number of each surface of optical components in the optical pick-up 100 shown in FIGS. 10A-10C. In Table 18, a surface #0 represents the light source 10A, surfaces #1 and #2 represent a front surface (a light source side surface) and a rear surface (an objective lens side surface) of the coupling lens 20A, respectively, and surfaces #9 and #10 represent the cover layer and the data recording layer of the optical disc D1, respectively. In Table 19, a surface #0 represents the light source 10B, surfaces #1 and #2 represent a front surface (a light source side surface) and a rear surface (an objective lens side surface) of the coupling lens 20B, respectively, and surfaces #9 and #10 represent the cover layer and the recording layer of the optical disc D2, respectively.

In each of Tables 18 and 19, surfaces #3 and #4 represent a front surface and a rear surface of the beam splitter 41, respectively, surfaces #5 and #6 represent a front surface and a rear surface of the beam splitter 42, respectively, and surfaces #7 and #8 represent the first surface 30a and the second surface 30b of the objective lens 30, respectively.

In Table 20, a surface #0 represents the light source 10C, and surfaces #1 and #2 represent a front surface (a light source side surface) and a rear surface (an objective lens side surface) of the coupling lens 20C, respectively. Surfaces #3 and #4 represent the front surface and the rear surface of the beam splitter 42, respectively. Surfaces #5 and #6 represent the first surface 30a and the second surface 30b of the objective lens 30, respectively. Surfaces #7 and #8 represent the cover layer and the data recording layer of the optical disc D3, respectively.

Each of the rear surface (#2) of the coupling lens 20A, the rear surface (#2) of the coupling lens 20B, the rear surface (#2) of the coupling lens 20C and the first and second surfaces 30a and 30b of the objective lens 30 is an aspherical surface.

Table 21 shows the conical coefficient and aspherical coefficients of the rear surface (#2) of the coupling lens 20A and the first and second surfaces 30a and 30b (#7 and #8) of the objective lens 30 when the recording and/or reproducing operation for the optical disc D1 is performed. Table 22 shows the conical coefficient and aspherical coefficients of the rear surface (#2) of the coupling lens 20B and the first and second surfaces 30a and 30b (#7 and #8) of the objective lens 30 when the recording and/or reproducing operation for the optical disc D2 is performed. Table 23 shows the conical coefficient and aspherical coefficients of the rear surface (#2) of the coupling lens 20C and the first and second surfaces 30a and 30b (#5 and #6) of the objective lens 30 when the recording and/or reproducing operation for the optical disc D3 is performed.

TABLE 21

| Surface No. | #2 | #7 | #8 |
|---|---|---|---|
| K | 0.0000 | −0.6500 | 0.0000 |
| A4 | 8.0470E−05 | 2.7400E−03 | 3.1160E−02 |
| A6 | 5.5160E−07 | 3.4200E−04 | −9.6060E−03 |
| A8 | 3.2570E−09 | 3.8620E−05 | 2.5650E−03 |
| A10 | 0.0000E+00 | −4.0150E−06 | −4.5070E−04 |
| A12 | 0.0000E+00 | 1.4416E−06 | 3.6795E−05 |

TABLE 22

| Surface No. | #2 | #7 | #8 |
|---|---|---|---|
| K | 0.0000 | −0.6500 | 0.0000 |
| A4 | 8.4750E−05 | 2.7400E−03 | 3.1160E−02 |
| A6 | 8.5280E−07 | 3.4200E−04 | −9.6060E−03 |
| A8 | 7.5420E−09 | 3.8620E−05 | 2.5650E−03 |
| A10 | 0.0000E+00 | −4.0150E−06 | −4.5070E−04 |
| A12 | 0.0000E+00 | 1.4416E−06 | 3.6795E−05 |

TABLE 23

| Surface No. | #2 | #5 | #6 |
|---|---|---|---|
| K | 0.0000 | −0.6500 | 0.0000 |
| A4 | 9.4050E−05 | 2.7400E−03 | 3.1160E−02 |
| A6 | 2.0000E−06 | 3.4200E−04 | −9.6060E−03 |
| A8 | 4.1000E−08 | 3.8620E−05 | 2.5650E−03 |
| A10 | 0.0000E+00 | −4.0150E−06 | −4.5070E−04 |
| A12 | 0.0000E+00 | 1.4416E−06 | 3.6795E−05 |

The first surface 30a of the objective lens 30 is configured to have the diffracting structure shown in FIG. 3B. That is, the diffracting structure is formed in the second region 32b on the first surface 30a of the objective lens 30. Table 24 shows numerical data of the diffracting structure formed in the second region 32b on the first surface 30a.

TABLE 24

| Annular zone No. | Hs | He | La (unit: $\lambda_1$) | |
|---|---|---|---|---|
| #0 | 0.000 | 1.590 | 0 | First region |
| #1 | 1.590 | 1.599 | −3 | Second region |
| #2 | 1.599 | 1.623 | 0 | |
| #3 | 1.623 | 1.649 | −3 | |
| #4 | 1.649 | 1.663 | 0 | |
| #5 | 1.663 | 1.699 | −3 | |
| #6 | 1.699 | 1.707 | 0 | |
| #7 | 1.707 | 1.750 | −3 | |
| #8 | 1.750 | 1.761 | 0 | |
| #9 | 1.761 | 1.801 | −3 | |
| #10 | 1.801 | 1.835 | 0 | |
| #11 | 1.835 | 1.851 | −3 | |
| #12 | 1.851 | 1.871 | 0 | |
| #13 | 1.871 | 1.879 | −3 | |
| #14 | 1.879 | 1.942 | 0 | |
| #15 | 1.942 | 1.950 | −3 | |

In Table 24, the first region 31b on the first surface 30a is defined as an annular zone #0. The second region 32b has fifteen annular zones #1-#15. "Hs" represents a height, from the optical axis, at which the annular zone starts. "He" represents a height, from the optical axis, at which the annular zone ends. For example, the annular zone #15 is formed within a range of height h from 1.942 mm to 1.950 mm.

"La" represents an additional optical path length added in each annular zone with respect to the annular zone #0. In other words, with regard to adjacent annular zones, the additional optical path length La represents an optical path length added in the outer annular zone with respect to the inner annular zone. The additional optical path length La is defined as a multiple with respect to $\lambda_1$ ($\lambda_1$ is the wavelength of the first laser beam).

Since in this example the effective beam diameter of the first laser beam on the incident surface (the first surface 30a)

of the objective lens 30 is equal to the effective beam diameter of the second laser beam on the incident surface of the objective lens 30, the third region 33b is not formed.

With regard to the objective lens 30 in the optical pick-up 100 according to the third example, f1×M1 is 0.000, f2×M2 is −0.071, and f3×M3 is −0.237. Therefore, the conditions (1), (2) and (3) are satisfied. As can be seen from Tables 17 and 18, λ1/(n1−1): λ3/(n3−1) is 1:2. Therefore, the relationship (4) is also satisfied.

Figure 13:
FIG. 13 is a graph illustrating the spherical aberration caused in the optical pick-up of the third or fourth example when the third laser beam passes through the objective lens.
Figure 12:
FIG. 12 is a graph illustrating the spherical aberration caused in the optical pick-up of the third or fourth example when the second laser beam passes through the objective lens.
Figure 11:
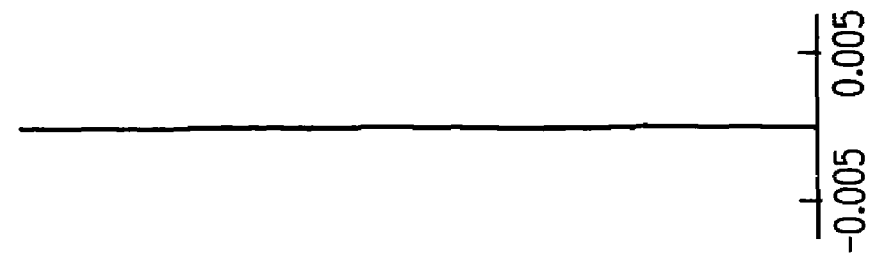
FIG. 11 is a graph illustrating the spherical aberration caused in the optical pick-up of the third or fourth example when the first laser beam passes through the objective lens.

FIG. 11 is a graph illustrating the spherical aberration caused in the optical pick-up 100 of the third example when the first laser beam passes through the objective lens 30 (i.e., when the optical disc D1 is used). FIG. 12 is a graph illustrating the spherical aberration caused in the optical pick-up 100 of the third example when the second laser beam passes through the objective lens 30 (i.e., when the optical disc D2 is used). FIG. 13 is a graph illustrating the spherical aberration caused in the optical pick-up 100 of the third example when the third laser beam passes through the objective lens 30 (i.e., when the optical disc D3 is used).

As shown in FIGS. 11-13, according to the third example, the spherical aberration is sufficiently corrected for each of the optical discs D1, D2 and D3. Therefore, the beam spots suitable for the recording and/or reproducing operation of optical discs D1, D2 and D3 are formed on the data recording layers of the optical discs D1, D2 and D3, respectively.

FOURTH EXAMPLE

Hereafter, the optical pick-up 100 according to a fourth example will be described. The optical pick-up 100 according to the fourth example has a configuration substantially the same as that of the third example. The numerical data shown in Tables 17, 18, 19, 20, 21, 22 and 23 are also applied to the fourth example. Only the diffracting structure formed within the second region 32b on the first surface 30a of the objective lens 30 is different from that of the third example.

Table 25 shows numerical data of the diffracting structure formed in the second region 32b on the first surface 30a.

TABLE 25

| Annular zone No. | Hs | He | La (unit: λ₁) | |
|---|---|---|---|---|
| #0 | 0.000 | 1.590 | 0 | First region |
| #1 | 1.590 | 1.597 | 0 | Second region |
| #2 | 1.597 | 1.644 | −5 | |
| #3 | 1.644 | 1.651 | 0 | |
| #4 | 1.651 | 1.706 | −5 | |
| #5 | 1.706 | 1.713 | 0 | |
| #6 | 1.713 | 1.780 | −5 | |
| #7 | 1.780 | 1.800 | 0 | |
| #8 | 1.800 | 1.809 | −5 | |
| #9 | 1.809 | 1.852 | 0 | |
| #10 | 1.852 | 1.859 | −5 | |
| #11 | 1.859 | 1.907 | 0 | |
| #12 | 1.907 | 1.914 | −5 | |
| #13 | 1.914 | 1.950 | 0 | |

All symbols in Table 25 have the same meanings as those of Table 24. In this example, the second region 32b has thirteen annular zones #1-#13.

Since in this example the effective beam diameter of the first laser beam on the incident surface (the first surface 30a) of the objective lens 30 is equal to the effective beam diameter of the second laser beam on the incident surface of the objective lens 30, the third region 33b is not formed.

Similarly to the third example, the fourth example satisfies all of the conditions (1)-(3) and the relationship (4). Similarly to the third example, the spherical aberration caused when the optical disc D1 is used is represented by the graph shown in FIG. 11, the spherical aberration caused when the optical disc D2 is used is represented by the graph shown in FIG. 12, and the spherical aberration caused when the optical disc D3 is used is represented by the graph shown in FIG. 13.

Therefore, according to the fourth example, the spherical aberration is sufficiently corrected for each of the optical discs D1, D2 and D3. The beam spots suitable for the recording and/or reproducing operation of optical discs D1, D2 and D3 are formed on the data recording layers of the optical discs D1, D2 and D3, respectively.

Although the present invention has been described in considerable detail with reference to certain preferred embodiments thereof, other embodiments are possible.

In the above mentioned embodiment, the diffracting structure is formed on the first surface 30a of the objective lens 30. However, the diffracting structure may be formed on the second surface 30b of the objective lens 30 or both of the first and second surfaces 30a and 30b of the objective lens 30. The numerical configurations have been described in the first though fourth examples by way of example. Other numerical configurations are also possible.

The present disclosure relates to the subject matter contained in Japanese Patent Application No. P2003-171466, filed on Jun. 17, 2003, which is expressly incorporated herein by reference in its entirety.

What is claimed is:

1. An objective lens for an optical pick-up which is used to record data to and/or to reproduce data from at least three types of optical discs by selectively using one of at least three light beams having different wavelengths, the at least three types of optical discs having at least two different thicknesses of cover layers, when a thickness of a first optical disc of the at least three types of optical discs to be used for recording data and/or reproducing data using a first light beam of the at least three light beams having a wavelength shortest of all the wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, t1 being substantially equal to 0.6 mm, t2 being substantially equal to 0.6 mm, and t3 being substantially equal to 1.2 mm, when a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, a relationship NA1≧NA2>NA3 being satisfied, when the first optical disc is used, a substantially collimated light beam of the first light beam being incident on said objective lens, when the second and third optical discs are used, diverging beams of the second and third light beams being incident on said objective lens, respectively, given that magnification and a focal length of said objective lens are respectively represented by M1 and f1 when the first optical disc is used, the magnification and the focal length of said objective lens are respectively represented by M2 and f2 when the second optical disc is used, and the magnification and the focal length of said objective lens are respectively represented by M3 and f3 when the third optical disc is used, following conditions (1), (2) and (3) being satisfied:

$$-0.02 < f1 \times M1 < 0.02 \quad (1)$$

$$-0.10 < f2 \times M2 < -0.04 \quad (2)$$

$$-0.29 < f3 \times M3 < -0.19 \quad (3).$$

2. The objective lens according to claim 1, wherein at least one of lens surfaces of said objective lens includes:

a first region on which one of the first, second and third light beams corresponding to a numerical aperture required to record data to and/or to reproduce data from the third optical disc is incident; and a second region located outside the first region, wherein the first region has a diffracting structure having a function of converging the first, second and third light beams on data recording layers of the first, second and third optical discs, respectively, wherein the second region has a diffracting structure having a function of converging the first and second light beams on the data recording layers of the first and second optical discs, respectively, and having a function of not contributing to converging the third light beam, wherein the diffracting structure within the second region is configured such that a diffraction order at which diffraction efficiency is maximized for the first light beam is a third order and that a diffraction order at which diffraction efficiency is maximized for the second light beam is a second order.

3. The objective lens according to claim 1, wherein at least one of lens surfaces of said objective lens includes:

a first region on which one of the first, second and third light beams corresponding to a numerical aperture required to record data to and/or to reproduce data from the third optical disc is incident; and a second region located outside the first region, wherein the second region has a diffracting structure having a function of converging the first and second light beams on data recording layers of the first and second optical discs, respectively, and having a function of not contributing to converging the third light beam, wherein the diffracting structure within the second region is configured such that, at each step between adjacent refractive surfaces portions, an additional optical path length for the first laser beam added in an outer refractive surface portion with respect to an inner refractive surface portion is substantially equal to $3\lambda_1$ or $-3\lambda_1$, where $\lambda_1$ represents a wavelength of the first laser beam.

4. The objective lens according to claim 1, wherein at least one of lens surfaces of said objective lens includes:

a first region on which one of the first, second and third light beams corresponding to a numerical aperture required to record data to and/or to reproduce data from the third optical disc is incident; and a second region located outside the first region, wherein the second region has a diffracting structure having a function of converging the first and second light beams on data recording layers of the first and second optical discs, respectively, and having a function of not contributing to converging the third light beam, wherein the diffracting structure within the second region is configured such that, at each step between adjacent refractive surfaces portions, an additional optical path length for the first laser beam added in an outer refractive surface portion with respect to an inner refractive surface portion is substantially equal to $5\lambda_1$ or $-5\lambda_1$, where $\lambda_1$ represents a wavelength of the first laser beam.

5. The objective lens according to claim 2, wherein an effective beam diameter of the first light beam on an incident surface of said objective lens is larger than an effective beam diameter of the second light beam on the incident surface of said objective lens, wherein the at least one of lens surfaces of said objective lens includes a third region located outside the second region, the third region having a diffracting structure having a function of converging only the first light beam, wherein the third region is configured such that a diffraction order at which diffraction efficiency is maximized for the first light beam in the third region is different from a diffraction order at which diffraction efficiency is maximized for the first light beam in the second region.

6. The objective lens according to claim 2, wherein an effective beam diameter of the second light beam on an incident surface of said objective lens is larger than an effective beam diameter of the first light beam on the incident surface of said objective lens, wherein the at least one of lens surfaces of said objective lens includes a third region located outside the second region, the third region having a diffracting structure having a function of converging only the second light beam, wherein the third region is configured such that a diffraction order at which diffraction efficiency is maximized for the second light beam in the third region is different from a diffraction order at which diffraction efficiency is maximized for the second light beam in the second region.

7. The objective lens according to claim 2, wherein the first region is located on the at least one of lens surfaces of said objective lens to include an optical axis of the objective lens.

8. The objective lens according to claim 3, wherein the first region is configured to be a continuous surface.

9. An optical pick-up used for recording data to and/or reproducing data from at least three types of optical discs having at least two different thicknesses of cover layers, comprising:

light sources capable of emitting at least three light beams having different wavelengths, one of the at least three light beams being selectively emitted when one of the at least three types of optical discs is used; and an objective lens, when a thickness of a first optical disc of the at least three types of optical discs to be used for recording data and or reproducing data using a first light beam of the at least three light beams having a wavelength shortest of all the wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, t1 being substantially equal to 0.6 mm, t2 being substantially equal to 0.6 mm, and t3 being substantially equal to 1.2 mm, when a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, a relationship NA1≧NA2>NA3 being satisfied, when the first optical disc is used, a substantially collimated light beam of the first light beam being incident on said objective lens, when the second and third optical discs are used, diverging beams of the second and third light beams being incident on said objective lens, respectively, given that magnification and a focal length of said objective lens are respectively represented by M1 and f1 when the first optical disc is used, the magnification and the focal length of said objective lens are respectively represented by M2 and f2 when the second optical disc is used, and the magnification and the focal length of said objective lens are respectively represented by M3 and f3 when the third optical disc is used, following conditions (1), (2) and (3) being satisfied:

$$-0.02 < f1 \times M1 < 0.02 \tag{1}$$

$$-0.10 < f2 \times M2 < -0.04 \tag{2}$$

$$-0.29 < f3 \times M3 < -0.19 \tag{3}$$

10. The optical pick-up according to claim 9, wherein at least one of lens surfaces of said objective lens includes:

a first region on which one of the first, second and third light beams corresponding to a numerical aperture required to record data to and/or to reproduce data from the third optical disc is incident; and a second region located outside the first region, wherein the first region has a diffracting structure having a function of converging the first, second and third light beams on data recording layers of the first, second and third optical discs, respectively, wherein the second region has a diffracting structure having a function of converging the first and second light beams on the data recording layers of the first and second optical discs, respectively, and having a function of not contributing to converging the third light beam, wherein the diffracting structure within the second region is configured such that a diffraction order at which diffraction efficiency is maximized for the first light beam is a third order and that a diffraction order at which diffraction efficiency is maximized for the second light beam is a second order.

11. The optical pick-up according to claim 9, wherein at least one of lens surfaces of said objective lens includes:

a first region on which one of the first, second and third light beams corresponding to a numerical aperture required to record data to and/or to reproduce data from the third optical disc is incident; and a second region located outside the first region, wherein the second region has a diffracting structure having a function of converging the first and second light beams on data recording layers of the first and second optical discs, respectively, and having a function of not contributing to converging the third light beam, wherein the diffracting structure within the second region is configured such that, at each step between adjacent refractive surfaces portions, an additional optical path length for the first laser beam added in an outer refractive surface portion with respect to an inner refractive surface portion is substantially equal to $3\lambda_1$ or $-3\lambda_1$, where $\lambda_1$ represents a wavelength of the first laser beam.

12. The optical pick-up according to claim 9, wherein at least one of lens surfaces of said objective lens includes:

a first region on which one of the first, second and third light beams corresponding to a numerical aperture required to record data to and/or to reproduce data from the third optical disc is incident; and a second region located outside the first region, wherein the second region has a diffracting structure having a function of converging the first and second light beams on data recording layers of the first and second optical discs, respectively, and having a function of not contributing to converging the third light beam, wherein the diffracting structure within the second region is configured such that, at each step between adjacent refractive surfaces portions, an additional optical path length for the first laser beam added in an outer refractive surface portion with respect to an inner refractive surface portion is substantially equal to $5\lambda_1$, or $-5\lambda_1$, where $\lambda_1$ represents a wavelength of the first laser beam.

13. The optical pick-up according to claim 10, wherein an effective beam diameter of the first light beam on an incident surface of said objective lens is larger than an effective beam diameter of the second light beam on the incident surface of said objective lens, wherein the at least one of lens surfaces of said objective lens includes a third region located outside the second region, the third region having a diffracting structure having a function of converging only the first light beam, wherein the third region is configured such that a diffraction order at which diffraction efficiency is maximized for the first light beam in the third region is different from a diffraction order at which diffraction efficiency is maximized for the first light beam in the second region.

14. The optical pick-up according to claim 10, wherein an effective beam diameter of the second light beam on an incident surface of said objective lens is larger than an effective beam diameter of the first light beam on the incident surface of said objective lens, wherein the at least one of lens surfaces of said objective lens includes a third region located outside the second region, the third region having a diffracting structure having a function of converging only the second light beam, wherein the third region is configured such that a diffraction order at which diffraction efficiency is maximized for the second light beam in the third region is different from a diffraction order at which diffraction efficiency is maximized for the second light beam in the second region.

15. The optical pick-up according to claim 10, wherein the first region is located on the at least one of lens surfaces of said objective lens to include an optical axis of the objective lens.

16. The optical pick-up according to claim 11, wherein the first region is configured to be a continuous surface.

17. The optical pick-up according to claim 9, wherein when wavelengths of the first and third light beams are respectively represented by $\lambda 1$ and $\lambda 3$, and refractive indexes of said objective lens for the first and third light beams are respectively represented by $n1$ and $n3$, a following relationship is satisfied:

$$\lambda 1/(n1-1):\lambda 3/(n3-1) \cong 1:2 \qquad (4).$$

* * * * *